(12) United States Patent
Achterberg et al.

(10) Patent No.: US 10,181,780 B2
(45) Date of Patent: Jan. 15, 2019

(54) STATOR DEVICE FOR A LINEAR MOTOR AND LINEAR TRANSPORT SYSTEM

(71) Applicant: Beckhoff Automation GmbH, Verl (DE)

(72) Inventors: Jan Achterberg, Duisburg (DE); Uwe Prüssmeier, Lemgo (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 790 days.

(21) Appl. No.: 14/600,139

(22) Filed: Jan. 20, 2015

(65) Prior Publication Data

US 2015/0137625 A1    May 21, 2015

Related U.S. Application Data

(63) Continuation of application No. 14/497,412, filed on Sep. 26, 2014, which is a continuation of application No. PCT/EP2013/053273, filed on Feb. 19, 2013.

(30) Foreign Application Priority Data

Mar. 27, 2012 (DE) ........................ 10 2012 204 919

(51) Int. Cl.
*H02K 41/03* (2006.01)
*B65G 54/02* (2006.01)
(Continued)

(52) U.S. Cl.
CPC ........... *H02K 41/031* (2013.01); *B65G 54/02* (2013.01); *H02K 11/30* (2016.01); *H02K 41/02* (2013.01); *H02K 41/03* (2013.01)

(58) Field of Classification Search
CPC ...... H02K 41/03; H02K 11/30; H02K 41/031; H02K 41/02; B65G 54/02
(Continued)

(56) References Cited

U.S. PATENT DOCUMENTS 5,134,324 A     7/1992   Sakagami et al.
5,701,042 A * 12/1997   Takei ................... H02K 41/031
                                                                       310/12.01
(Continued)

FOREIGN PATENT DOCUMENTS

AT           509101 A1     6/2011
CN         1295000 A     5/2001
(Continued)

OTHER PUBLICATIONS

First Chinese Office Action for Chinese Patent Application No. 201380017399.8, dated May 10, 2016 (7 pages).
(Continued)

*Primary Examiner* — Naishadh Desai
(74) *Attorney, Agent, or Firm* — Dorsey & Whitney LLP

(57) ABSTRACT

A stator device for a linear motor comprises an electrically energizable magnetic field generator for forming a magnetic field, the magnetic field generator comprising a stator tooth and a coil wound around the stator tooth and a holding module for holding the magnetic field generator, the holding module having a first and a second holding device, wherein the magnetic field generator is arranged between the two holding devices in that a first end of the stator tooth is fixed to the first holding device and a second end of the stator tooth is fixed to the second holding device.

13 Claims, 16 Drawing Sheets

(51) Int. Cl.
*H02K 41/02* (2006.01)
*H02K 11/30* (2016.01)

(58) Field of Classification Search
USPC .......................................................... 310/13
See application file for complete search history.

(56) References Cited

U.S. PATENT DOCUMENTS

| | | | |
|---|---|---|---|
| 5,841,208 A * | 11/1998 | Abe | H02K 11/33 |
| | | | 310/171 |
| 6,011,389 A * | 1/2000 | Masreliez | G01D 5/2046 |
| | | | 324/207.17 |
| 6,191,507 B1 * | 2/2001 | Peltier | B65G 54/02 |
| | | | 310/12.02 |
| 6,611,138 B2 | 8/2003 | Vasiloiu | |
| 6,664,665 B2 | 12/2003 | Hsiao | |
| 6,781,524 B1 | 8/2004 | Clark et al. | |
| 6,876,107 B2 | 4/2005 | Jacobs | |
| 6,920,699 B2 | 7/2005 | Reusing et al. | |
| 7,170,241 B1 * | 1/2007 | Faizullabhoy | H02P 25/06 |
| | | | 310/12.19 |
| 2002/0049553 A1 | 4/2002 | Schmid et al. | |
| 2002/0104716 A1 | 8/2002 | Zaharia | |
| 2003/0230941 A1 * | 12/2003 | Jacobs | B60L 15/38 |
| | | | 310/12.19 |
| 2004/0163270 A1 | 8/2004 | Reusing et al. | |
| 2005/0173991 A1 * | 8/2005 | Watarai | H02K 41/03 |
| | | | 310/12.25 |
| 2006/0001518 A1 | 1/2006 | Hayashi et al. | |
| 2008/0036305 A1 | 2/2008 | Raos | |
| 2008/0265691 A1 | 10/2008 | Shikayama et al. | |
| 2009/0230785 A1 * | 9/2009 | Ida | H02K 41/03 |
| | | | 310/12.31 |
| 2010/0253170 A1 | 10/2010 | Bi et al. | |
| 2011/0278958 A1 * | 11/2011 | Kawakami | H02K 41/02 |
| | | | 310/12.25 |
| 2012/0223724 A1 | 9/2012 | Vasiloiu et al. | |
| 2013/0181547 A1 | 7/2013 | Nishifukumoto et al. | |
| 2013/0270928 A1 * | 10/2013 | Nord | H02K 1/145 |
| | | | 310/12.26 |
| 2015/0008768 A1 | 1/2015 | Achterberg et al. | |
| 2015/0048693 A1 | 2/2015 | Prussmeier | |
| 2015/0048817 A1 | 2/2015 | Prussmeier | |
| 2015/0137625 A1 | 5/2015 | Achterberg et al. | |

FOREIGN PATENT DOCUMENTS

| | | |
|---|---|---|
| CN | 1933304 A | 3/2007 |
| CN | 1954477 A | 4/2007 |
| CN | 101292412 A | 10/2008 |
| CN | 100592609 C | 2/2010 |
| CN | 102255470 A | 11/2011 |
| DE | 69003365 T2 | 2/1994 |
| DE | 10138164 A1 | 2/2003 |
| DE | 10300918 A1 | 7/2004 |
| DE | 102004057205 A1 | 6/2005 |
| DE | 102004050337 B3 | 2/2006 |
| EP | 1070786 A2 | 1/2001 |
| EP | 1164358 B1 | 8/2005 |
| EP | 1758231 A1 | 2/2007 |
| JP | H02264306 A | 10/1990 |
| JP | 04210771 A | 7/1992 |
| JP | 06165475 A | 6/1994 |
| JP | 10066327 A | 3/1998 |
| JP | H11173872 A | 7/1999 |
| JP | 2000014119 A | 1/2000 |
| JP | 2000055647 A | 2/2000 |
| JP | 2000324789 A | 11/2000 |
| JP | 2003247861 A | 9/2003 |
| JP | 2007288967 | 11/2007 |
| JP | 2010074977 A | 4/2010 |
| JP | 2011097750 A | 5/2011 |
| WO | 96/27544 | 9/1996 |
| WO | 2011/129773 A1 | 10/2011 |
| WO | 2013143728 A2 | 10/2013 |
| WO | 2013143783 A1 | 10/2013 |
| WO | 2013143950 A2 | 10/2013 |

OTHER PUBLICATIONS

First Office Action for related Chinese patent application No. 2013800175368 (4 pages).
First Chinese Office Action for Chinese Patent Application No. 201380022569.1, dated Mar. 21, 2016 (7 pages).

* cited by examiner

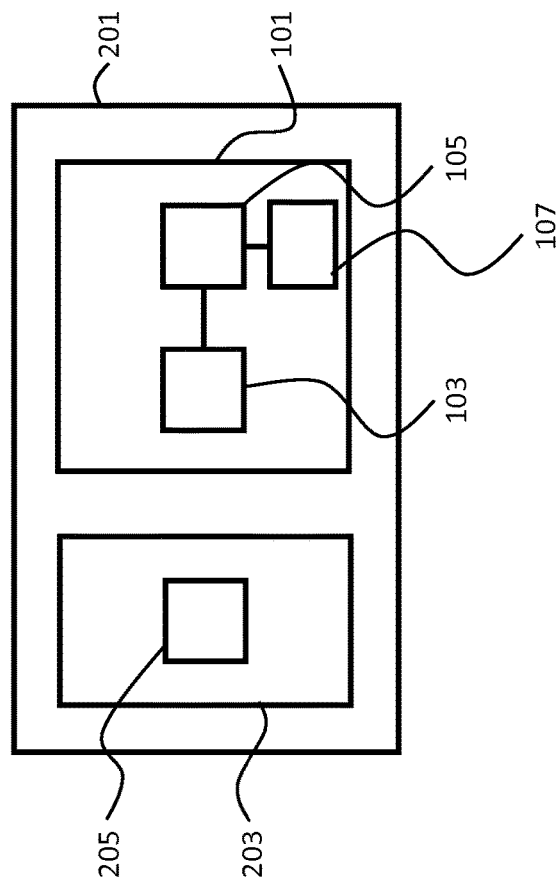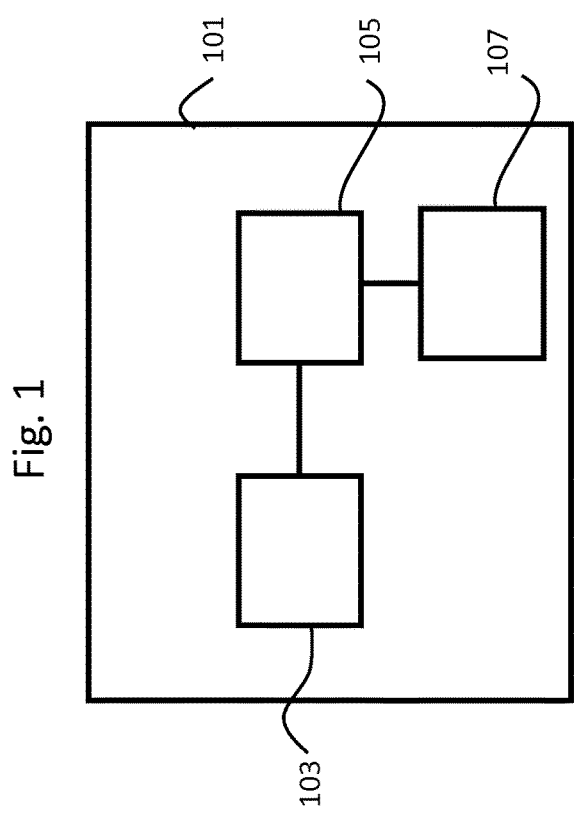

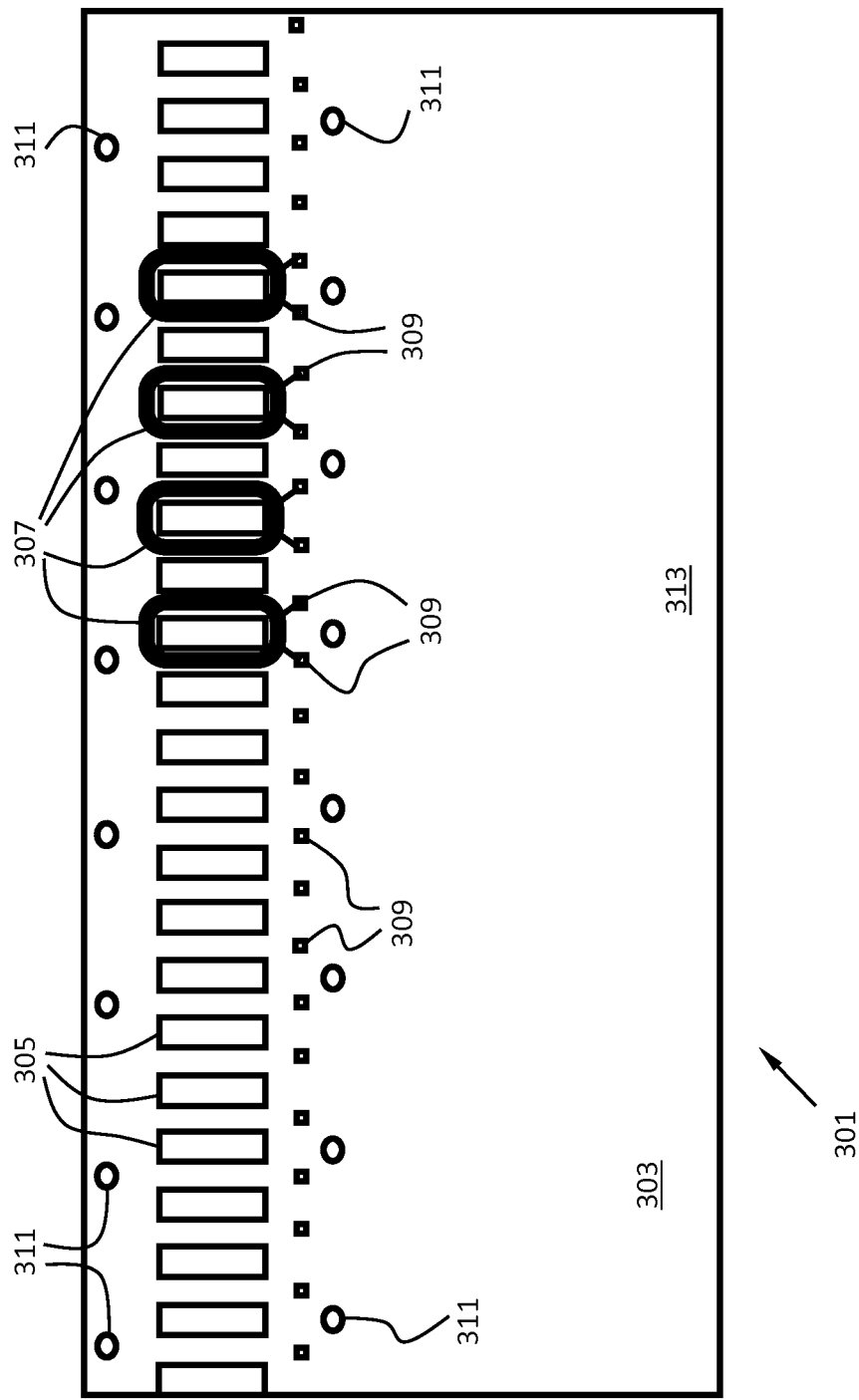

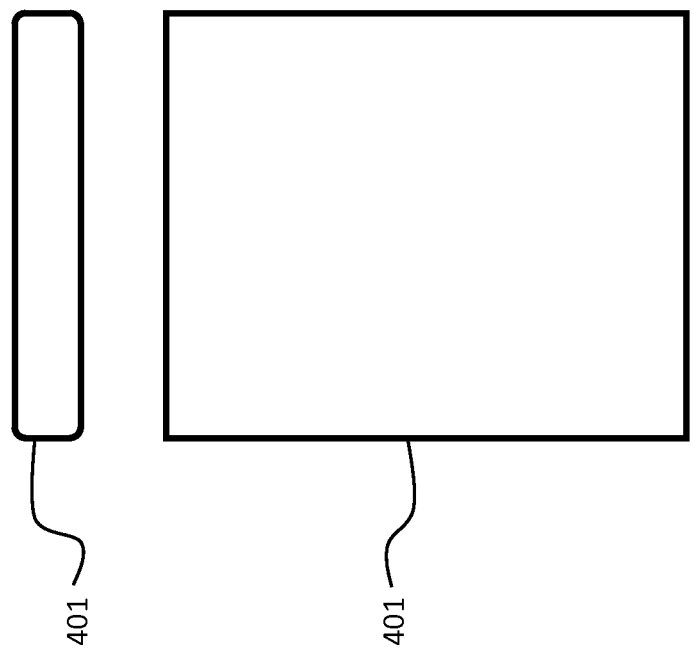

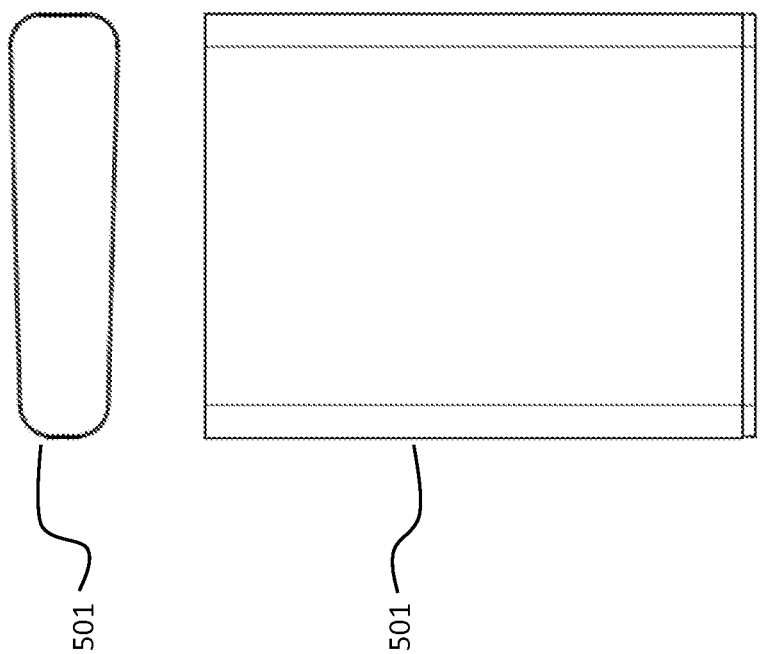

STATOR DEVICE FOR A LINEAR MOTOR AND LINEAR TRANSPORT SYSTEM

CROSS-REFERENCE TO RELATED APPLICATIONS

This application is a continuation of U.S. patent application Ser. No. 14/497,412, filed on Sep. 26, 2014, entitled STATOR DEVICE FOR A LINEAR MOTOR AND LINEAR TRANSPORT SYSTEM, which is a continuation of International Patent Application No. PCT/EP2013/053273, filed on Feb. 19, 2013, which claims priority to German Patent Application No. DE 10 2012 204 919.3, filed on Mar. 27, 2012, each of which is incorporated by reference herein, in the entirety and for all purposes.

FIELD

The invention relates to a stator device for a linear motor. The invention also relates to a linear transport system.

BACKGROUND

WO 96/27544 discloses a device for transporting products between different stations. Here, a carriage is provided which has a U-shaped yoke, wherein permanent magnets are formed on the inner sides of the yoke. Within the yoke there are arranged multiple air-core coils which are seated on a support plate. When the air-core coils are electrically energized, a magnetic field forms, which magnetic field interacts with the magnetic field of the permanent magnets of the yoke such that the carriage is subjected to a translatory movement. The air-core coils form an air gap between the permanent magnets. Said gap must be kept small in order to achieve a good action of force. The mechanical strength opposes this and does not permit good strength. The mechanical guide cannot be combined with the coil arrangement in this way. Furthermore, air-core coils have the disadvantage of high magnetic leakage losses, in particular in the case of relatively large dimensions. In general, air-core coils are characterized by low inductivity, which leads to a lower thrust force for a given construction and mode of activation.

U.S. Pat. No. 6,876,107 B2 discloses a transport system. Here, a carriage having a U-shaped yoke is provided, wherein permanent magnets are arranged on inner sides of the U-shaped yoke. Within the U-shaped yoke there are formed two opposing coils. With corresponding energization of the coils, a magnetic field forms which interacts with the magnetic field of the permanent magnets such that the carriage performs a translatory movement. Owing to the high number of coils required, such a construction exhibits high complexity, which leads to high costs for the components and the cabling thereof etc. Furthermore, such a construction requires a considerable amount of installation space.

The known systems are thus disadvantageous in particular in that they require a considerably large installation space and exhibit mechanical instabilities, which can for example lead to disturbing vibrations during operation. Furthermore, the known systems also have the above disadvantages described in conjunction with air-core coils.

Furthermore, the known systems have disadvantages in conjunction with guides for the carriages or vehicles. For example, in U.S. Pat. No. 6,876,107 B2, as a guide, a rail is provided which is integrated directly into a support device of the coils. That is to say in particular that, when the rails become worn and must consequently be replaced, it is necessary to exchange the complete support device together with the coils. Furthermore, it is also not possible here to provide different rails according to the application, that is to say for example for a specific vehicle, without also simultaneously exchanging the support device together with the coils.

In WO 96/27544, the rails for running rollers of the vehicle or of the carriage are arranged independently of the air-core coils, wherein the air-core coils are glued to a support plate. Installation and adjustment of a spacing between the rails and air-core coils are difficult owing to this independent fastening and arrangement. This may for example have the result that a spacing between the rails and the air-core coils cannot be optimally set, which can consequently lead in particular to increased wear and/or a lower motor thrust force.

JP 06165475 A presents a linear motor comprising a stator. The stator comprises a hollow yoke which is assembled from two side walls, a cover and a base. Multiple coils are formed on the two side walls. A printed circuit board is mounted on the coils. A slider as a movable element is formed around the stator, wherein the slider has permanent magnets on walls situated opposite the coils.

US 2008/0036305 A1 presents a linear motor comprising multiple core/winding units which each comprise a core composed of steel and a coil wound around the core. Here, the core/winding units are fastened to holding elements, wherein the holding elements themselves are fastened to a frame.

SUMMARY

The present invention provides an improved stator device and an improved linear motor.

According to one aspect of the invention, a stator device for a linear motor comprises an electrically energizable magnetic field generator for forming a magnetic field, the magnetic field generator comprising a stator tooth and a coil wound around the stator tooth and a holding module for holding the magnetic field generator, the holding module having a first and a second holding device, wherein the magnetic field generator is arranged between the two holding devices in that a first end of the stator tooth is fixed to the first holding device and a second end of the stator tooth is fixed to the second holding device.

According to a further aspect of the invention, a stator device for a linear motor comprises an electrically energizable magnetic field generator for forming a magnetic field, a holding module for holding the magnetic field generator and a support module for supporting the holding module, the support module comprising an installation space for an electronic component.

According to a further aspect of the invention, a linear transport system comprises a stator device, the stator device having a first and a second electrically energizable magnetic field generator, each magnetic field generator forming a magnetic field and comprising a stator tooth and a coil wound around the stator tooth, wherein a non-wound stator tooth is arranged between the first and the second magnetic field generator, and a support for a vehicle, the support comprising at least one reaction part which is designed to interact with the magnetic field formed by means of the magnetic field generator of the stator device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows a stator device.

FIG. 2 shows a linear transport system.

FIG. 3 shows elements of a further stator device.

FIG. 4 shows a stator tooth.

FIG. 5 shows a further stator tooth.

DETAILED DESCRIPTION

Figure 6:
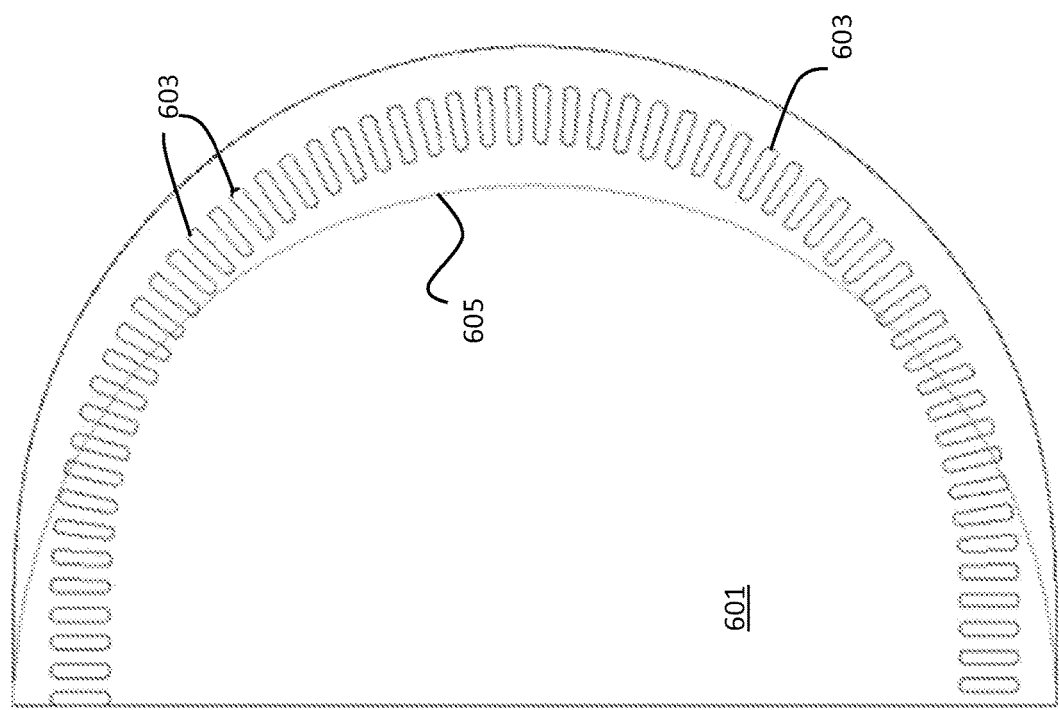
FIG. 6 shows a printed circuit board.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Below, the same reference numerals may be used for identical features.

FIG. 1 shows a stator device 101 for a linear motor. The stator device 101 comprises a magnetic field generator 103 for generating a magnetic field. The magnetic field generator 103 is electrically energizable. This means in particular that, when the magnetic field generator 103 is electrically energized, a corresponding magnetic field is formed.

The stator device 101 also comprises a holding module 105 which is designed to hold the magnetic field generator 103. Here, the magnetic field generator 103 is fastened to the holding module 105.

The stator device 101 also comprises a mounting device 107 which is designed for the fastening or mounting of a guide for guiding a vehicle. This thus means in particular that the guide can be fastened to the mounting device 107. Here, the mounting device 107 is formed separately from the holding module 105. The holding module 105 is fastened to the mounting device 107.

FIG. 2 shows a linear transport system 201. The linear transport system 201 comprises the stator device 101 as per FIG. 1. The linear transport system 201 also has a support 203 on which a further magnetic field generator 205 is arranged as a reaction part. The further magnetic field generator 205 may for example comprise one or more permanent magnets. The further magnetic field generator 205 may alternatively comprise, in particular, a soft magnetic material. The support 203 is designed in particular for being fastened to a vehicle, in particular to a carriage. By means of corresponding electromagnetic interaction between the magnetic field of the magnetic field generator 103 and of the further magnetic field generator 205, the support 203 and thus any vehicle fastened thereto can be displaced. In an embodiment, multiple further magnetic field generators 205 may be provided.

In a further embodiment, the further magnetic field generator 205 may be arranged in a beveled configuration and/or may preferably have a trapezoidal shape. This advantageously results in smaller force ripples in relation to a further magnetic field generator arranged in a straight configuration and having a rectangular shape, which furthermore advantageously leads to a more uniform movement or displacement of the support 203.

In another embodiment, it may be provided that, instead of the further magnetic field generator 205, the reaction part is formed as a structure composed of a soft magnetic material, or comprises a structure of said type.

FIG. 3 shows elements of a further stator device 301. The stator device 301 comprises a first printed circuit board 303 as first holding device of a holding module. The printed circuit board 303 has multiple first cutouts 305. The first cutouts 305 have a rectangular shape. The first cutouts 305 are arranged parallel and adjacent to one another, wherein the corresponding transverse sides of the first cutouts 305 lie in each case on a line (not illustrated here). A rectilinear arrangement of the first cutouts 305 is thus advantageously realized.

Furthermore, multiple coils 307 are formed which are wound in each case around a stator tooth. The coils 307 with the stator teeth thus form a magnetic field generator. Here, one end of the stator tooth is inserted into the first cutout 305, such that the first cutouts 305 hold the coils 307. Here, the stator teeth preferably have a rectangular shape such that they fit into the first cutouts 305 in particular with a form fit.

Furthermore, the printed circuit board 303 comprises multiple solder pads 309 which are arranged along the first cutouts 305. The electrical contacting of the printed circuit board 303 with the coils 307 can be realized by means of the solder pad 309. This thus means in particular that the coils 307, in this case in particular corresponding coil ends, can be soldered to the printed circuit board 303.

Furthermore, the printed circuit board 303 comprises multiple holes 311 for through bores, in order for the printed circuit board 303 to thereby be fastened to profile elements, in particular by screw connection. The holes 311 are formed in a region above and below the respective transverse sides of the first cutout 305.

As shown in FIG. 3, between two coils 307, there is provided a first cutout 305 into which no stator tooth with a coil, that is to say no wound stator tooth, is inserted.

It may preferably be provided that said first cutout 305 between two coils 307 remains free. In an alternative advantageous embodiment, a non-wound stator tooth may be inserted into said first cutout 305 between two coils 307. This advantageously yields a particular level of mechanical stabilization, in particular if, on the printed circuit board 303, a second printed circuit board of analogous form is mounted congruently such that the stator teeth can likewise be inserted into corresponding cutouts of the second printed circuit board. The cutouts of the second printed circuit board may in particular be referred to as second cutouts.

Such a second printed circuit board thus advantageously forms a second holding device for holding the coils 307 of the holding module, wherein the coils 307 are arranged between the two printed circuit boards.

The second printed circuit board may preferably have no solder pads. This thus means in particular that the second printed circuit board has no solder pads for electrical contacting of the coils 307. Thus, the electrical contacting of the coils 307 then takes place only via the first printed circuit board 303.

After arrangement of the second printed circuit board on the first printed circuit board 303 by means of screw connection and/or fastening of the printed circuit boards into corresponding profile elements, an installation space, also referred to as structural space, is formed in a region 313 situated opposite a printed circuit board region below the first cutouts 305, in which installation space or structural space there can be installed, for example, electronics components such as for example activation electronics and/or power electronics and/or detection system electronics of a position detection system. Here, signals are preferably measured from which a position of a vehicle can be calculated in particular by means of a superordinate controller.

In an embodiment, an installation space of said type may be formed in the profile element or in the profile elements. In a further embodiment, a rail for guidance of the electronic components may be formed in the installation space. In a further embodiment, the installation space may be in the form of a tunnel running through the profile element.

One of the above-mentioned profile elements may preferably simultaneously be formed as a mounting device.

FIG. 4 shows a stator tooth 401. The upper drawing in FIG. 4 shows the stator tooth 401 in a plan view. A side view of the stator tooth 401 is shown below the plan view.

The stator tooth 401 has a rectangular shape. In an embodiment, it may be provided that the stator tooth 401 has a square shape. The stator tooth 401 as per FIG. 4 is in particular designed such that it can be inserted into the first and second cutouts of the two printed circuit boards of the stator device 301 in FIG. 3.

FIG. 5 shows a further stator tooth 501. The upper drawing in FIG. 5 shows a plan view of the stator tooth 501. The drawing below the plan view shows a side view of the stator tooth 501.

As shown in FIG. 5, the stator tooth 501 has a trapezoidal shape. The stator tooth 501 is designed in particular to be inserted into cutouts which have a corresponding shape such that the stator tooth 501 can be inserted into said cutout with a form fit. It is then advantageously also possible, for example, for a curve to be formed by means of such cutouts by virtue of the multiple cutouts being arranged along a curve.

The two geometric shapes of the stator teeth 401 and 501 as per FIGS. 4 and 5 are to be regarded merely as exemplary embodiments and not as restrictive. In particular, various other geometric shapes are also possible.

In the embodiment shown by way of example in FIGS. 4 and 5, the stator tooth may be manufactured from a sintered material. It is thus also possible for a stator tooth of said type to be manufactured from a sintered material using a simple sintering tool.

FIG. 6 shows a holding device which is in the form of a printed circuit board 601 and which has correspondingly formed cutouts into which the stator teeth 501 can preferably be inserted. The cutouts are denoted in FIG. 6 by the reference sign 603. Said cutouts are in this case arranged along a curve of clothoid form. A clothoid is in particular a curve in which a radius at the beginning is greater than a mean radius and a radius at a later point is smaller than a mean radius. This thus means in particular that a curvature profile of the clothoid increases linearly. Jerk-free travelling dynamics of a vehicle are thus advantageously realized. For comparison, a semicircular curve is shown and indicated by the reference sign 605.

The printed circuit board 601 may preferably have solder pads and/or holes for through bores, analogously to the printed circuit board 303. Analogously to the stator device 301 as per FIG. 3, a further printed circuit board may be provided which is of analogous form to the printed circuit board 601. Said two printed circuit boards may then preferably be arranged congruently one above the other and in particular screwed or fastened to arcuate profile elements. The stator teeth 501 are then inserted into and correspondingly fixed in the cutouts 603, wherein coils are wound around at least some of the stator teeth 501. One of the above-mentioned profile elements may preferably form a mounting device.

In an embodiment, stator teeth may be inserted into and fixed in first cutouts of a first printed circuit board, wherein fixing can be realized in particular by means of a form fit. The individual coils may subsequently be wound around the stator teeth. Alternatively, pre-wound coils may be pushed onto fixed stator teeth. It may alternatively be provided that individual stator teeth have a coil pre-wound thereon, and then the complete structural unit of stator tooth with coil is inserted into and fixed in the printed circuit board. It is thus possible to achieve a copper fill factor of the coils or of the coil winding of greater than 60%.

The geometries, shown in FIGS. 3 and 6, regarding the arrangement of the cutouts, that is to say on the one hand a linear arrangement and on the other hand an arrangement in clothoid form, are to be regarded merely as exemplary and not as restrictive. In embodiments, any desired geometries may be provided with regard to an arrangement of the cutouts. Such geometries may for example be an arc, a circle or a circular segment. For arcuate geometries, use is preferably made of trapezoidal stator teeth. It is also possible for preferably three-dimensional geometric arrangements to be provided by virtue of the holding devices having corresponding three-dimensional geometries.

Figure 7:
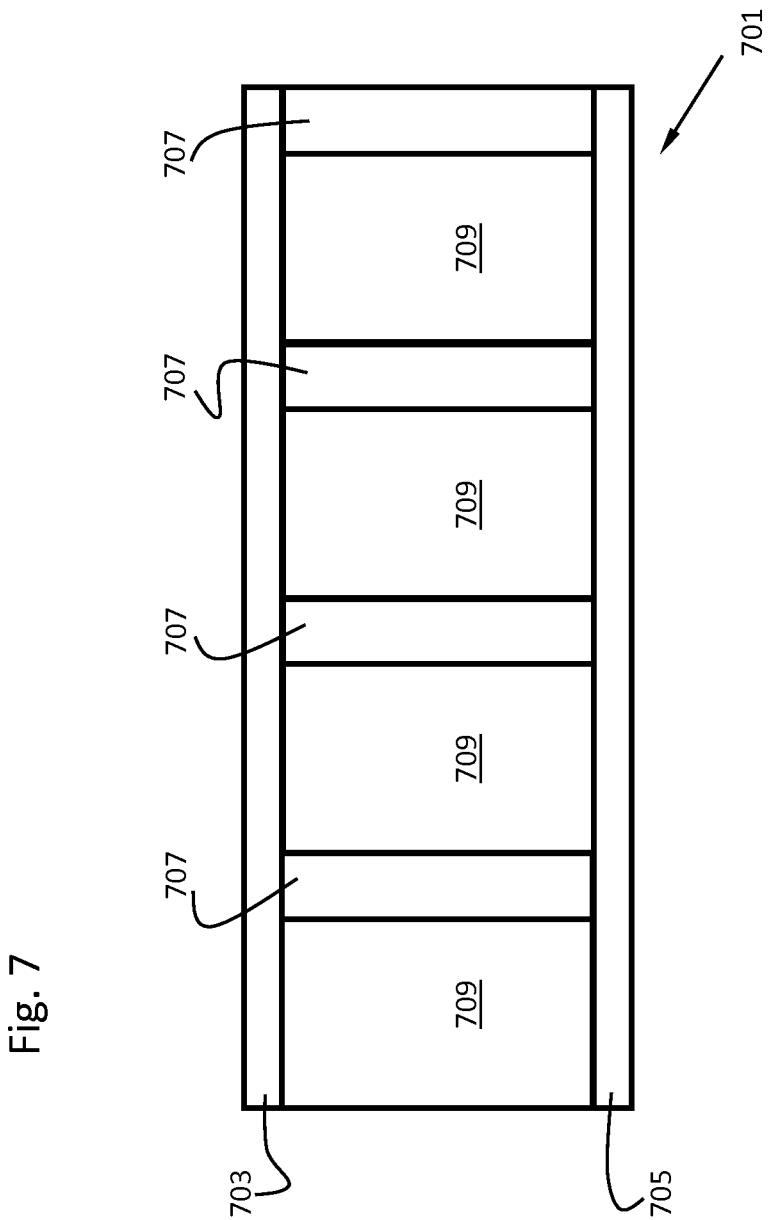
FIG. 7 shows another stator device.

FIG. 7 shows a further stator device 701 in a plan view. The stator device 701 comprises a first printed circuit board 703 and a second printed circuit board 705 as first and second holding devices of a holding module. The two printed circuit boards 703 and 705 are arranged parallel to and opposite one another. The two printed circuit boards 703 and 705 correspondingly have first and second cutouts which are arranged opposite one another. Into said cutouts there are inserted stator teeth 707, wherein a coil 709 is wound around every second stator tooth 707. Since the coil 709 covers the corresponding stator tooth 707, said stator tooth is not explicitly shown in the stator coils 709. This thus means in particular that a coil 709 and a non-wound stator tooth 707 are provided alternately. This thus means in particular that in each case one wound stator tooth and one unwound or non-wound stator tooth are provided alternately.

Figure 8:
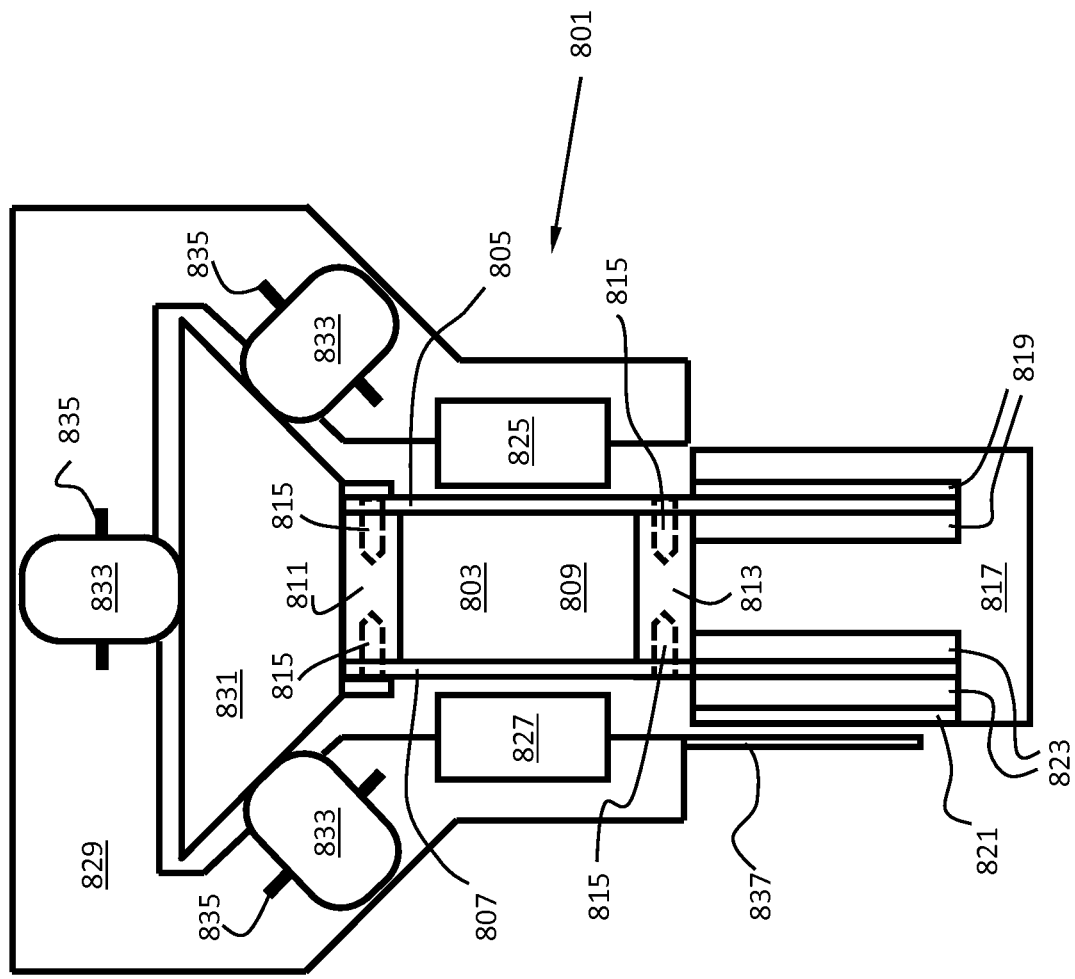
FIG. 8 shows a further linear transport system.

FIG. 8 shows a linear transport system 801 in a front-on cross-sectional view. The linear transport system 801 comprises a stator device 803. The stator device 803 comprises a first printed circuit board 805 and a second printed circuit board 807 as first and second holding device, respectively, of a holding module, said first printed circuit board and second printed circuit board being arranged parallel to and opposite one another. The stator device 803 with the two printed circuit boards 805 and 807 may in particular be of analogous form to the stator device 701 with the two printed circuit boards 703 and 705 as per FIG. 7. Corresponding statements made in conjunction with FIG. 7 preferably apply analogously to the stator device 803.

A region between the two printed circuit boards 805 and 807 of the stator device 803 is denoted by the reference sign 809 and may be referred to as a coil region by virtue of the fact that multiple coils are arranged in said region. Here, said coils are wound around stator teeth which are inserted into corresponding cutouts of the two printed circuit boards 805 and 807. Here, reference may again be made to FIG. 7, which shows an overview of a coil arrangement of said type.

A profile element 811 as mounting device is formed above the coil region 809. A profile element 813 is likewise formed below the coil region 809, the latter profile element running parallel to the former profile element 811. The two profile elements 811 and 813 have a longitudinal extent analogous to the two printed circuit boards 805 and 807, such that the two printed circuit boards 805 and 807 can be screwed to the two profile elements 811 and 813 by means of screws 815. For this purpose, the two printed circuit boards 805 and 807 have corresponding holes. The two profile elements 811 and 813 advantageously support the two printed circuit boards 805 and 807, and in particular advantageously generate mechanical stabilization of the stator device 803. The two profile elements 811 and 813 may thus preferably also be referred to as supporting profile elements. The two profile elements 811 and 813 are in particular arranged with a spacing small enough that thermal coupling is realized between the coils and the profile elements 811 and 813, such that it is advantageously possible for thermal energy that is generated during the operation of the coils, in particular during the energization thereof, to be dissipated such that overheating of the coils can be prevented in an effective manner. The two profile elements 811 and 813 may thus also preferably be referred to as a thermal energy dissipater for dissipating thermal energy.

Below the profile element 813 there is formed a support profile element 817 as a support module, on which the profile element 813 is arranged and/or fastened. This thus means in particular that the support profile element 817 supports the stator device 803. In an embodiment shown for example in FIG. 11, the profile element 813 and the support profile element 817 are, in a modification of the linear transport system 801 as per FIG. 8, formed as a common profile element, thus forming the support module. The support profile element 817 may in particular have a cavity, also referred to as installation space, into which the two printed circuit boards 805 and 807 project, wherein electronic components such as, for example, power electronics 819 and/or position detection system electronics 823 of a position detection system may be arranged in said cavity or installation space. A cavity of said type is in this case formed analogously, in particular adjacent, to the region 313 of the printed circuit board 303 of the stator device 301 in FIG. 3. The element with the reference sign 821 denotes a printed circuit board of the position detection system electronics 823.

The linear transport system 801 also comprises two permanent magnets, which may also be referred to as permanent magnets 825 and 827. The two permanent magnets 825 and 827 are arranged in each case adjacent to the coil region 809. This thus means in particular that the permanent magnet 825 is situated to the right of the printed circuit board 805. The permanent magnet 827 is situated on the left, adjacent to the printed circuit board 807. Here, the two permanent magnets 825 and 827 are arranged spaced apart from the corresponding printed circuit boards 805 and 807. A gap is thus formed in each case between the permanent magnets 825 and 827 and the printed circuit boards 805 and 807. Such an arrangement as per FIG. 8 may therefore also be referred to as a double gap arrangement.

In an embodiment, it is also possible for multiple permanent magnets 825 and 827 to be provided which are arranged in each case to the left and to the right of the corresponding printed circuit boards 805 and 807.

The permanent magnets 825 and 827 are held in each case by a support, wherein a vehicle 829 is fastened to the two supports.

Furthermore, a guide 831 for the vehicle 829 is arranged on the profile element 811, that is to say the mounting device, which is situated above the coil region 809.

The guide 831 has a trapezoidal shape, wherein, against three sides of the trapezium, there bears in each case one running roller 833 with corresponding running axle 835. The running rollers 833 are arranged on the vehicle 829 such that said running rollers enable the vehicle 829 to perform a rolling movement along the guide 831. The running rollers 833 may also, without limitation and with any desired variation, be provided in other embodiments with regard to position, arrangement, geometry and number.

In an embodiment, it may additionally or alternatively be provided that the vehicle is guided along the guide 831 in magnet-mounted and/or fluid-mounted, in particular gas-mounted, preferably air-mounted fashion.

A position detection element 837 in the form of an elongate areal element is formed on the support which holds the permanent magnets 827. Said element, which preferably at least partially comprises a metallic or metallized surface, runs downward away from the vehicle 829, so as to form an extension, in the direction of the support profile element 817 and is arranged opposite the position detection system electronics 823. The position detection system electronics 823 is designed in particular to detect the presence of the position detection element 837, such that a position of the vehicle 829 can advantageously be determined in this way. From the measured signals, it is preferably possible at some other location, for example by means of a superordinate controller, for a position to be calculated.

Figure 9:
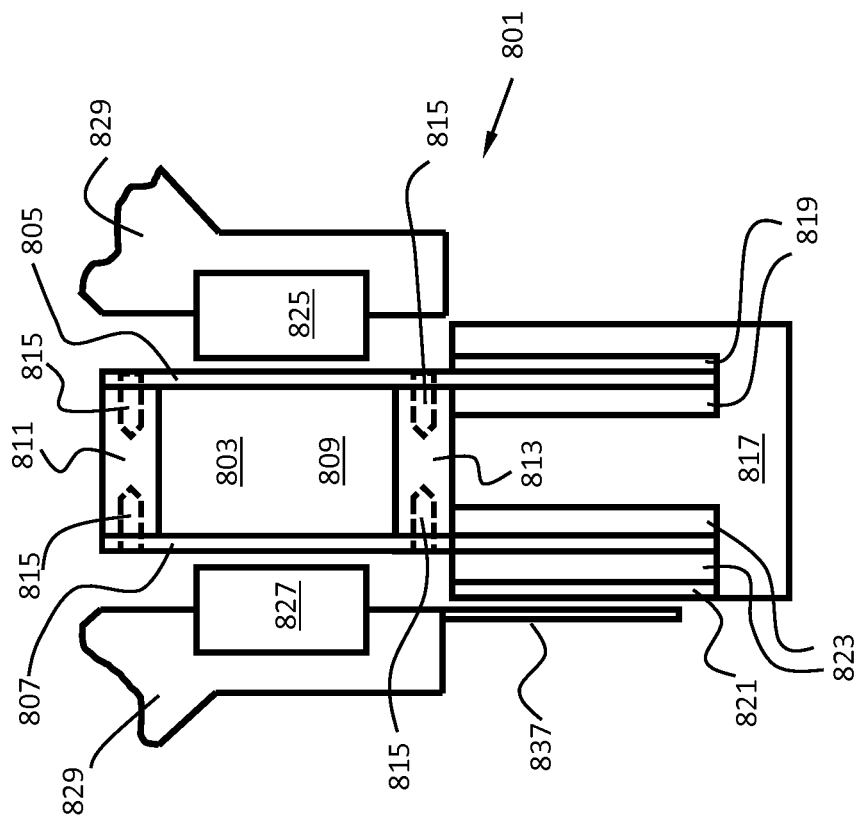
FIG. 9 shows the linear transport system as per FIG. 8 in a simplified illustration.

FIG. 9 shows the linear transport system 801 as per FIG. 8 in a slightly simplified illustration insofar as the vehicle 829, with the guide 831 and the running rollers 833, is not illustrated in its entirety here. It is pointed out here in particular that the linear transport system 801 is also disclosed without the vehicle 829 and a guide 831.

In an embodiment, it may be provided that, instead of the profile element 811, an encapsulation compound is provided as mounting device, wherein the encapsulation compound surrounds the coils in the coil region 809. This thus means in particular that the coils are encapsulated by the encapsulation compound. It is then possible, for example, for bores to be formed in an encapsulation compound of said type, which bores can receive corresponding fastening means such as screws or dowel pins, for example, for fastening the guide 831 to the encapsulation compound as mounting device.

In an embodiment, the mounting device may be arranged on an encapsulation compound of said type. A corresponding fastening may be realized for example by means of screws, rivets and/or dowel pins in corresponding bores of the encapsulation compound.

Figure 10:
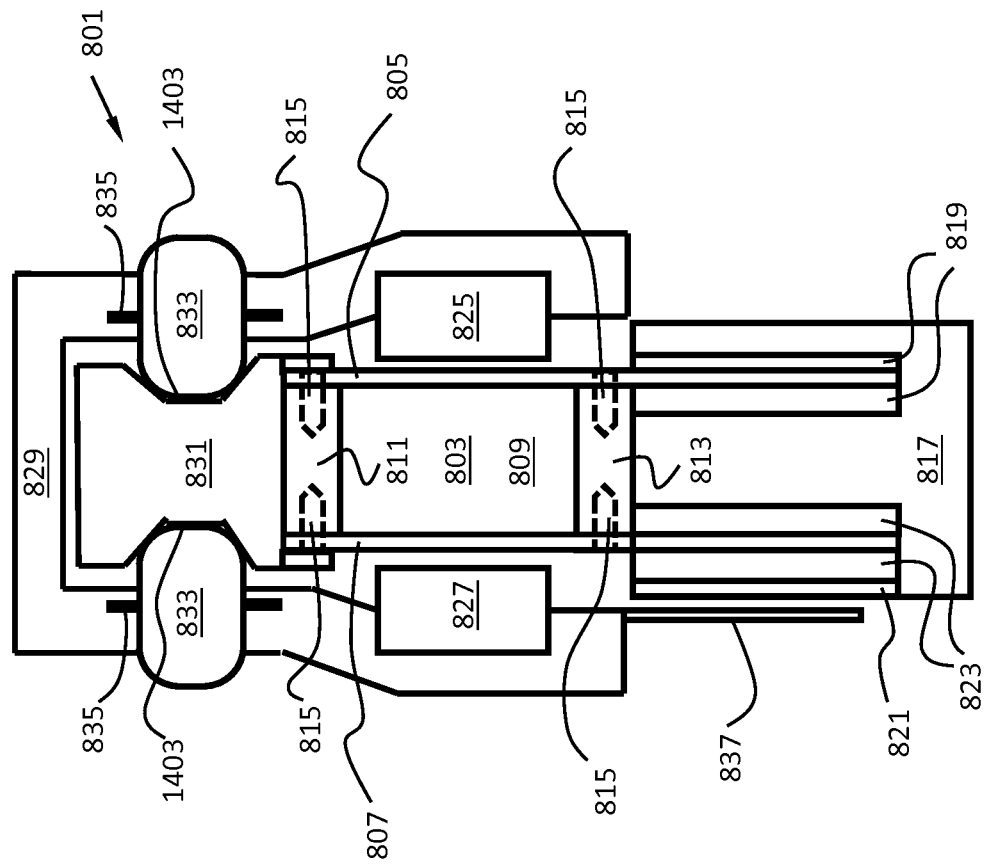
FIG. 10 shows a further linear transport system.

FIG. 10 shows a further linear transport system 801 which is of substantially analogous form to the linear transport system 801 as per FIG. 8.

As a difference with respect to the linear transport system 801 as per FIG. 8, the guide 831 has, in cross section, two opposite constrictions 1403. This thus means in particular that the guide 831 has an hourglass shape in cross section. It is then advantageously possible for the running rollers 833 to rest in said constrictions 1403 and run along in said constrictions 1403.

The embodiments of the running rollers 833 shown in FIG. 10 are to be understood merely as exemplary, and not as restrictive, with regard to position, arrangement, geometry and number.

Figure 11:
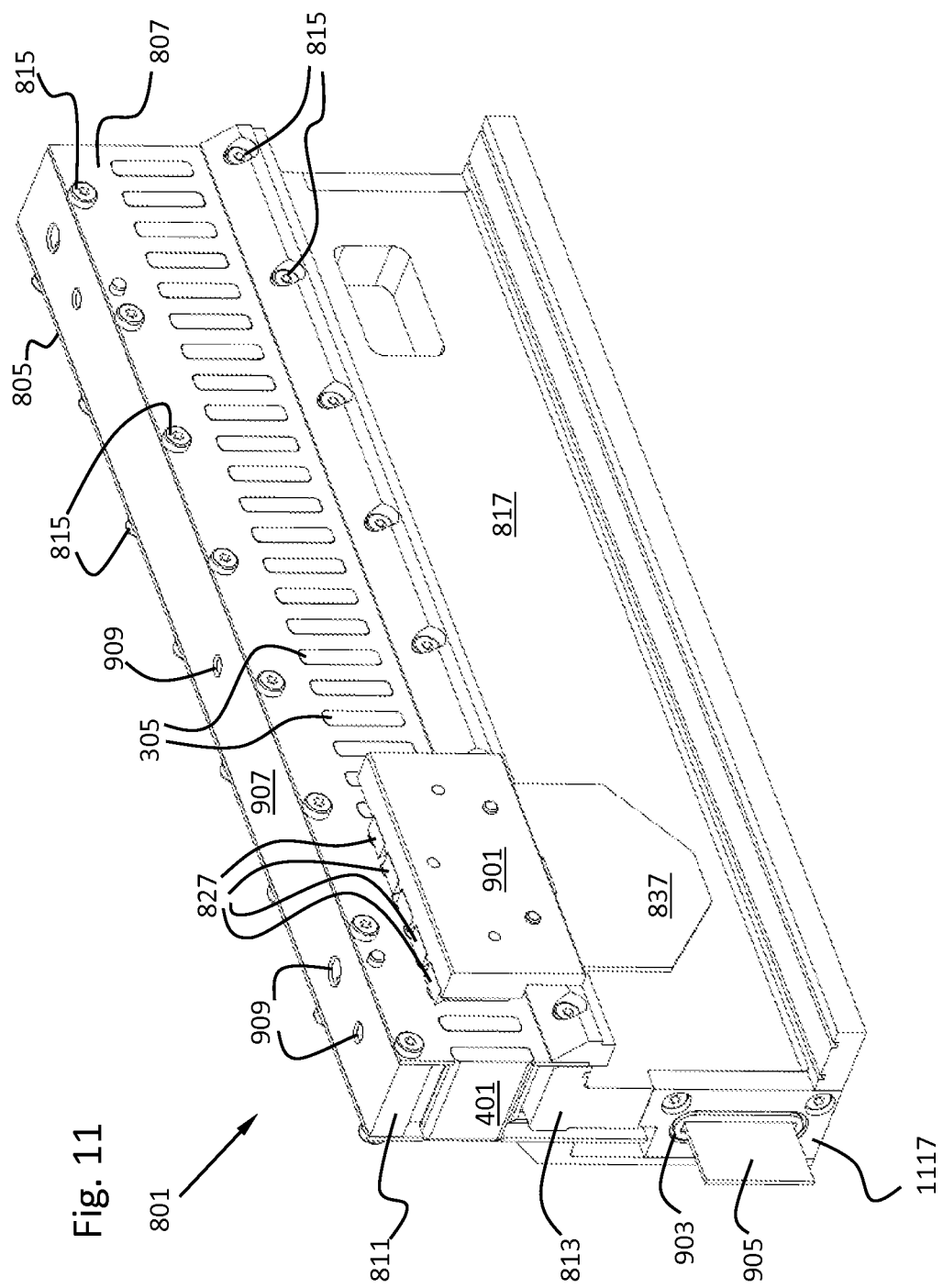
FIG. 11 shows a view of a modified embodiment of the linear transport system as per FIG. 8.

FIG. 11 shows an oblique plan view of the modification of the linear transport system 801 as per FIGS. 8, 9 and 10, wherein here, corresponding to the statements made above, the vehicle 829 and the guide 831 have been omitted for clarity.

FIG. 11 shows the support 901, which holds multiple permanent magnets 827. Also shown in more detail is the position detection element 837, which may in particular be in the form of an electrical board with damping action.

Also provided is a cover element 1117 by means of which the support module, which is in the form of a common profile element composed of profile element 813 and support profile element 817, is supported over its length. The cover element 1117 has an opening 903 into which a contacting printed circuit board 905 can be inserted. Electrical contacting of the printed circuit boards 805 and/or 807 is made possible by means of said contacting printed circuit board 905.

Figure 12:
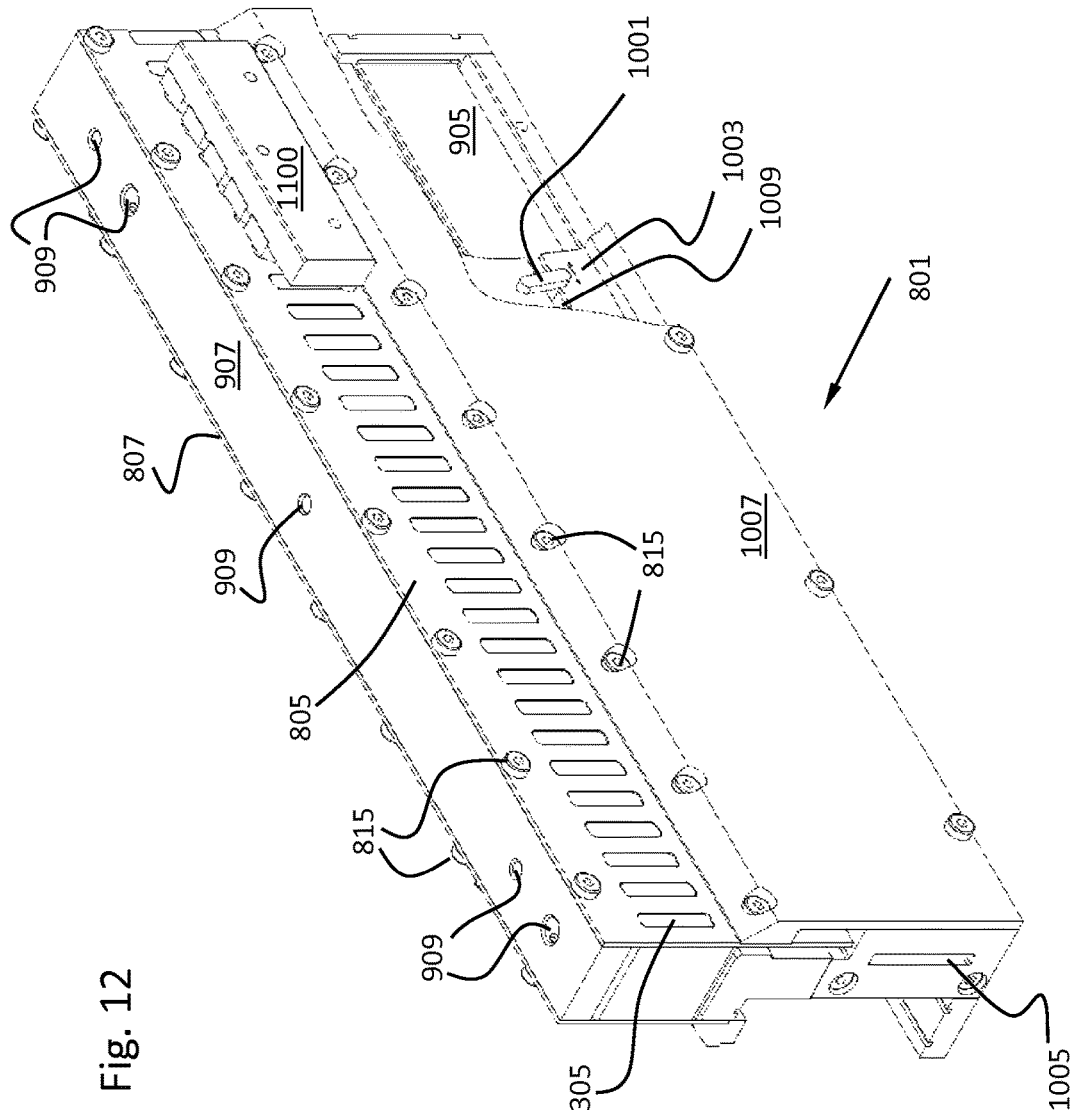
FIG. 12 shows a further view of the linear transport system as per FIG. 11.

FIG. 12 shows an oblique plan view, corresponding to a rear view in relation to the view as per FIG. 11, of the linear transport system 801. At a longitudinal end situated opposite the longitudinal end with the opening 903, there is provided a further opening 1005 into which there can be inserted a further contacting printed circuit board of a preceding further linear transport system. An electrical connection to a further linear transport system, which may be of analogous form to the linear transport system 801, is thus advantageously made possible. It is thus advantageously possible to form a modular system, wherein the individual modules may be formed by the linear transport systems 801. Here, the guide 831 may preferably be arranged across multiple such transport systems 801, such that joints between the individual transport systems 801 are omitted, which has a positive influence on the running smoothness of a vehicle.

The opening 903 and the further opening 1005 are connected to one another by means of a passage, such that a tunnel runs through the support profile element 817. Since an electronic component such as, in this case, for example, the contacting printed circuit board 905 can be inserted into a tunnel of said type, a tunnel of said type may also be referred to as an installation space for an electronic component. In an embodiment, a rail for guidance of the contacting printed circuit board 905 may be formed in the tunnel.

FIG. 12 furthermore shows a displacement means 1001 which interacts with the contacting printed circuit board 905 so as to generate a longitudinal displacement of the contacting printed circuit board 905. Said displacement is symbolically indicated here by means of a double arrow with the reference sign 1003. To make the displacement means 1001 visible, a detachably fastened cover plate 1007 is, for clarity, shown in symbolically cut-away form in the corresponding region.

Furthermore, the reference sign 1009 denotes a slot which is formed in a tunnel wall, wherein the displacement means 1001 is received in the slot 1009 such that the displacement means 1001 can slide back and forth in the slot 1009.

A contacting printed circuit board of said type has, in particular, the following action or function. Two linear transport systems can thereby be fastened, adjacent to one another in a longitudinal direction, to a holding profile or support plate, wherein by means of the displacement of the electrical board or contacting printed circuit board 905 from one system into the next system, contact is automatically established with the adjacent system. This thus means in particular that contact can be established between two linear transport systems by means of an electrical board 905. Behind the opening 1005 there is situated, for example, a plug connector composed of multiple spring contacts, such that the displaced-in electrical board 905 is held in position and contacted. This offers the advantage in particular that the individual modules or transport systems can, in the event of servicing, be removed in a sideways direction without the modules having to be slid apart from one another. Furthermore, the overall system comprising the two or more linear transport systems then also requires only one connection line to the voltage supply and/or for connection to a superordinate controller.

FIGS. 11 and 12 also show a surface 907 of the profile element 811, wherein the surface 907 has multiple cutouts 909 into which screws and/or rivets and/or dowel pins can be inserted or screwed in order to fasten the guide 831 to the profile element 811, that is to say the mounting device.

Figure 13:
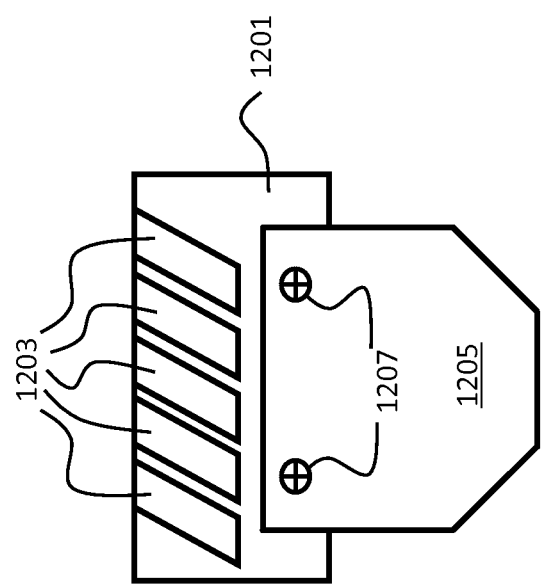
FIG. 13 shows a support.

FIG. 13 shows a support 1201 comprising multiple trapezoidal permanent magnets 1203. The support 1201 may preferably also be referred to as a magnet support.

Below the permanent magnets 1203 there is arranged a position detection element 1205 which is screwed to the support 1201 by means of screws 1207.

A support 1201 of said type may be used in particular in the linear transport system 801. The support 901 as per FIG. 11 is preferably of analogous form to the support 1201.

A vehicle may then preferably be fastened to the support 1201.

The trapezoidal shape of the permanent magnets 1203 advantageously results in smaller force ripples by comparison with permanent magnets of rectangular shape, which furthermore advantageously leads to a more uniform movement or displacement of the support 1201.

In FIG. 12, the reference sign 1100 denotes an alternative embodiment of the support which is of analogous form to the support 1201 as per FIG. 13 but does not have the position detection element 1205.

Figure 14:
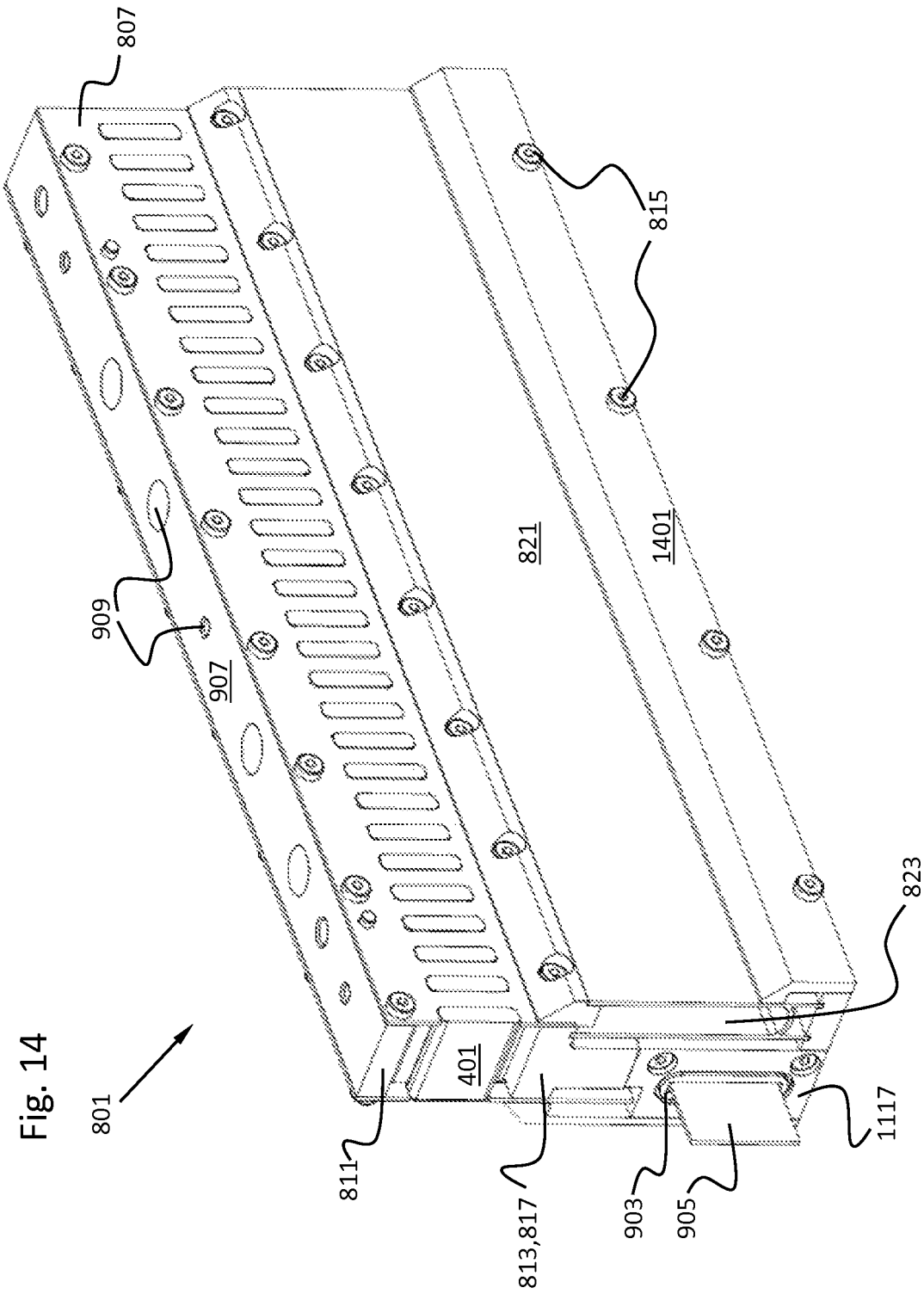
FIG. 14 shows a further view of the linear transport system as per FIG. 11.

FIG. 14 shows an oblique plan view of the linear transport system 801 as per FIGS. 8 to 12, wherein here, for a simplified illustration, neither the vehicle 829 nor the guide 831 nor the support 901 are shown.

The linear transport system as per FIG. 14 substantially corresponds to the linear transport system shown in FIG. 11, such that the explanations given regarding FIG. 11 also apply analogously to FIG. 14.

By contrast to the illustration in FIG. 11, FIG. 14 illustrates the printed circuit board 821 of the position detection system electronics 823, said printed circuit board being detachably fixed to the support profile element 817 by a holding element 1401 and by means of screws 815.

Figure 15:
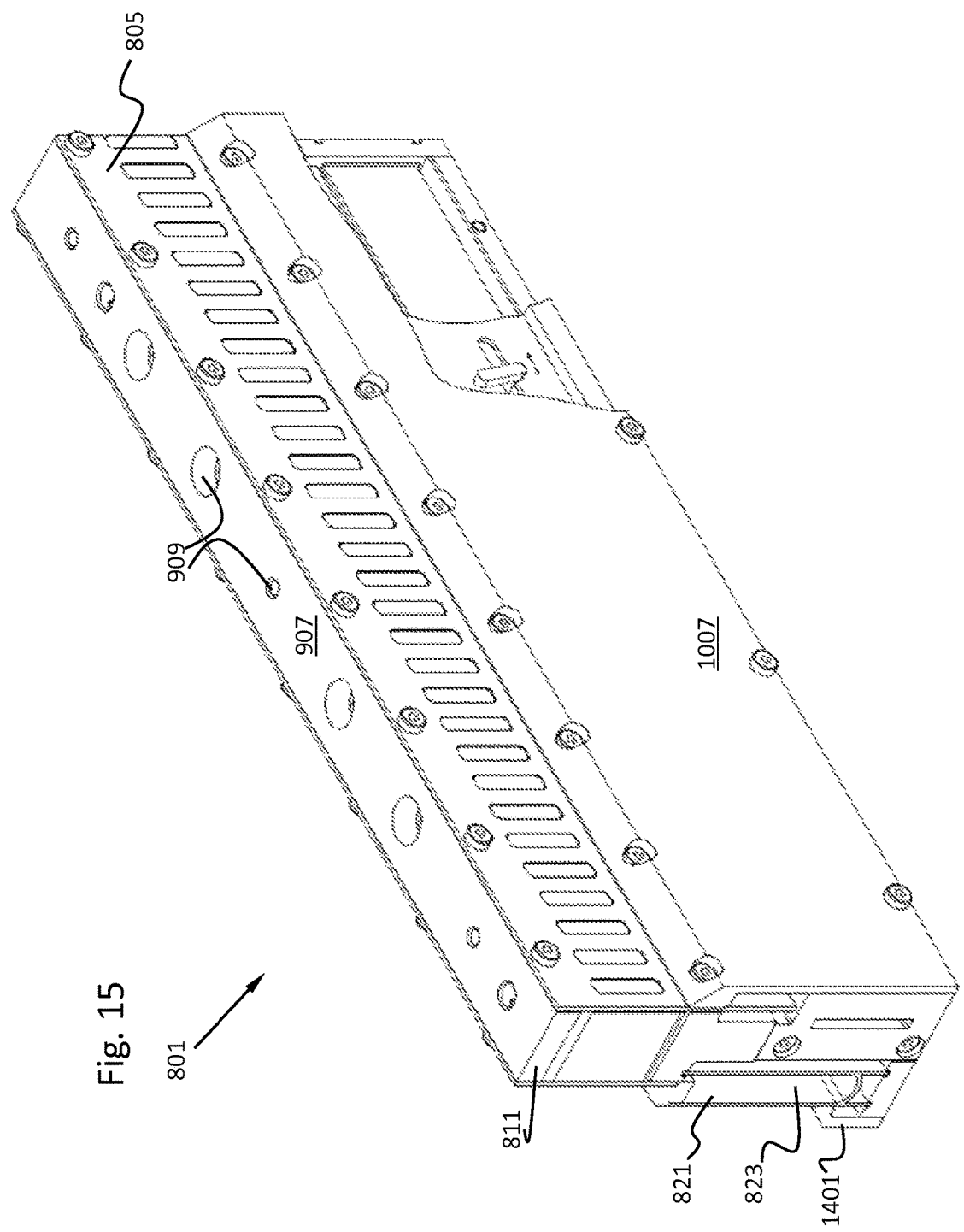
FIG. 15 shows a further view of the linear transport system as per FIG. 14.

FIG. 15 shows an oblique plan view, corresponding to a rear view in relation to the view as per FIG. 14, of the linear transport system 801. The explanations given with respect to FIGS. 11, 12 and 14 regarding the linear transport system 801 also apply analogously to FIG. 15, such that in order to avoid repetitions, reference is made to the explanations given previously.

Figure 16:
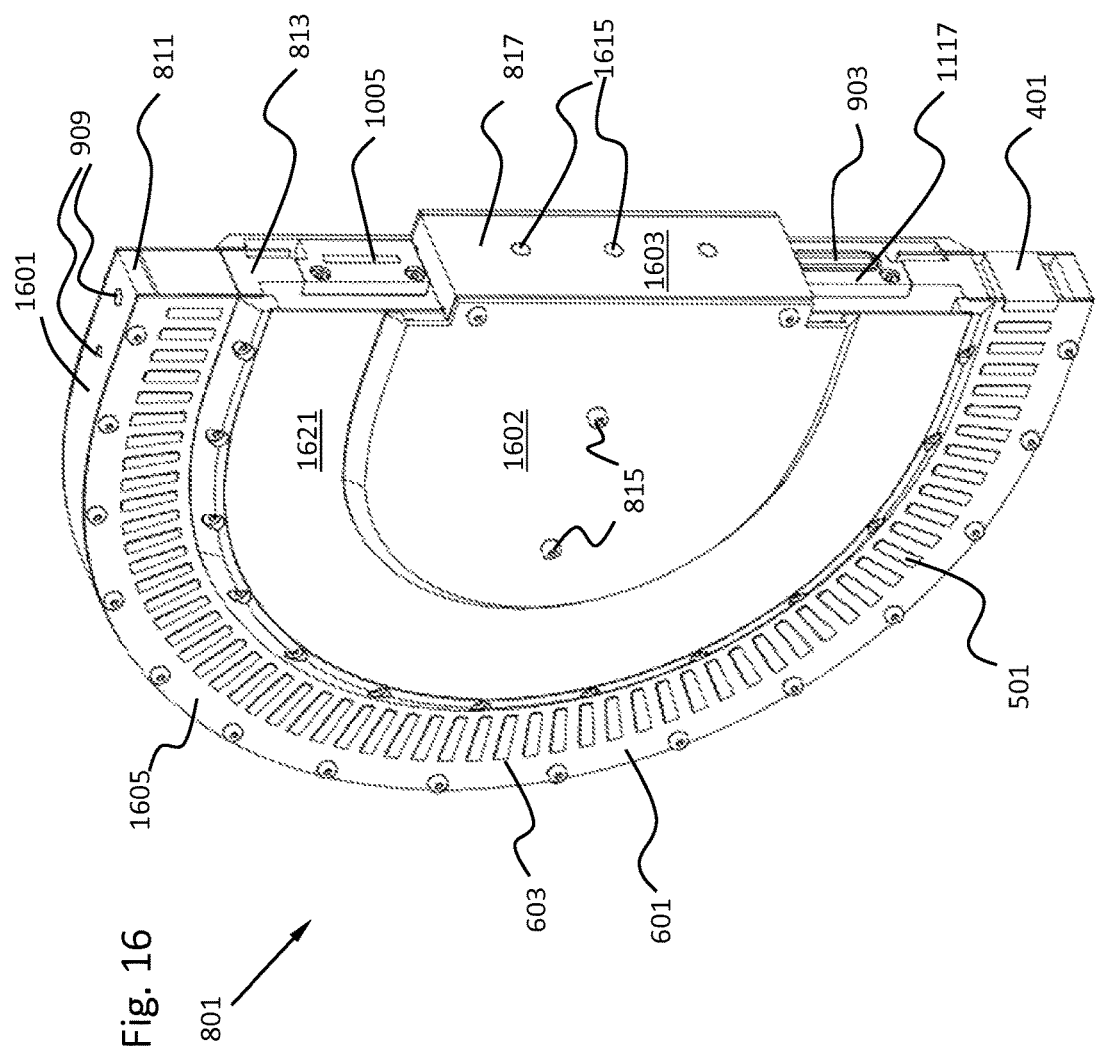
FIG. 16 shows a view of a linear transport system of arcuate form.

FIG. 16 shows an oblique plan view of a linear transport system 801 as per FIGS. 8 to 12 and 14 to 15 which is of arcuate form, wherein here, likewise for a simplified illustration, neither the vehicle 829 nor the guide 831 nor the support 901 are shown.

In terms of its functional scope, the printed circuit board 1605 corresponds to the printed circuit board 805 in FIG. 8, wherein owing to the arcuate shape, said printed circuit board 1605 is formed correspondingly to the printed circuit board 601 illustrated in FIG. 6. The explanations given with respect to FIGS. 4, 5 and 6 apply analogously to FIG. 16, such that in order to avoid repetitions, reference is made to the explanations given previously.

The surface 1601 of the profile element 811 of arcuate form likewise has multiple cutouts 909 into which screws and/or rivets and/or dowel pins can be inserted or screwed in order to fasten the guide 831 to the profile element 811, that is to say the mounting device.

Furthermore, the linear transport system 801 as per FIG. 16 has a printed circuit board 1621 of the position detection system electronics 823, the construction of which printed circuit board 1621 corresponds to that of the previously illustrated and described printed circuit board 821. The printed circuit board 1621 is detachably fixed to the support profile element 817 by means of a holding element 1602 and by means of screws 815.

Figure 17:
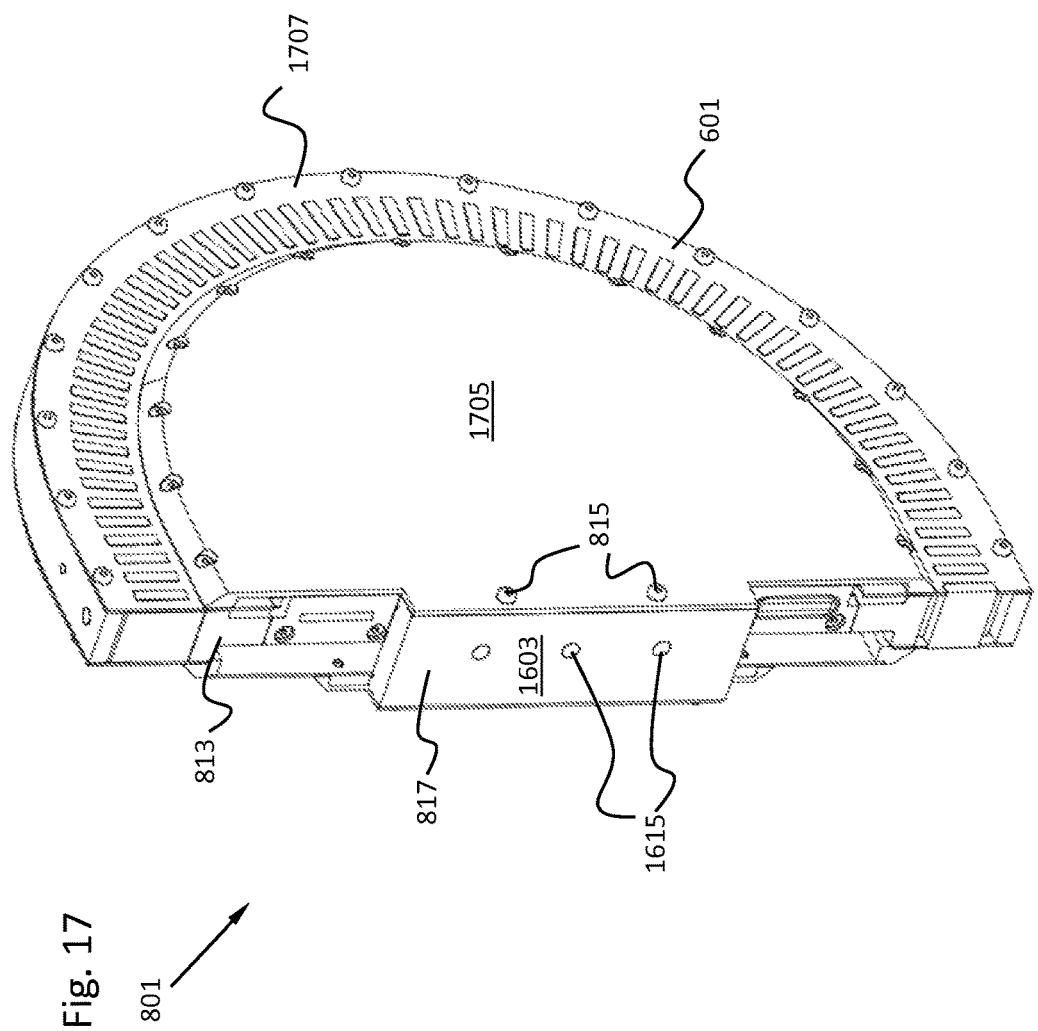
FIG. 17 shows a further view of the linear transport system of arcuate form as per FIG. 16.

FIG. 17 shows an oblique plan view, corresponding to a rear view in relation to the view as per FIG. 16, of the linear transport system 801. The explanations given with respect to FIGS. 11, 12, 14, 15 and 16 regarding the linear transport system 801 also apply analogously to FIG. 17, such that in order to avoid repetitions, reference is made to the explanations given previously.

In terms of its functional scope, the printed circuit board 1707 corresponds to the printed circuit board 807 in FIG. 8, wherein owing to the arcuate shape, said printed circuit board 1707 is formed correspondingly to the printed circuit board 601 illustrated in FIG. 6. The cover plate 1705 which is detachably fixed by means of screws 815 corresponds in terms of its construction and mode of operation to the cover plate 1007 illustrated in FIG. 12.

The support profile element 817, illustrated in FIGS. 16 and 17, of the linear transport system 801 of arcuate form has a projection 1603 which comprises fastening bores 1615 by means of which the linear transport system can be detachably fixed to a machine frame (not illustrated).

Above and below the projection 1603, the linear transport system 801 of arcuate form as per FIG. 16 or 17 may be adjoined for example by linear transport systems 801 of straight form corresponding to FIG. 11, 12, 14 or 15. For this purpose, the linear transport systems 801 of straight form are likewise detachably fixed to the machine frame. The displaceable electrical boards 905 are subsequently displaced from the openings 903 into the openings 1005, such that the individual modules of the linear transport system 801 are electrically contacted with one another. Correspondingly formed guides 831 are mounted on the surfaces 907 and 1601 of the profile element 811 and are fixed in a known way by means of the openings 909. Here, the guide 831 may also extend across a multiplicity of individual linear transport systems 801. The correspondingly formed vehicles 829 are then mounted on the guides 831, said vehicles being driven in the manner described further above.

If it is necessary to exchange an individual linear transport system 801 in the case of an overall system formed from a multiplicity of linear transport systems 801 of straight and/or arcuate form, then it would firstly be necessary to release the connection to the guide 831. Subsequently, the displaceable electrical board 905 would be displaced back into the adjacent linear transport system 801, and the displaceable electrical board 905 situated in the linear transport system 801 to be exchanged would be pulled back out of the other adjacent linear transport system 801. As a final dismounting step, the fixing to the machine frame would be released, thus making it possible to remove the linear transport system 801 to be exchanged. A new linear transport system 801 can then be integrated into the overall system in the reverse sequence. An advantage of such a modular construction can be seen in particular in the fact that only the linear transport system to be exchanged has to be released from the guide 831 and from the machine frame, and no handling of the remaining linear transport systems 801 in the overall system is necessary. In the case of servicing, this yields a considerable time and thus also cost advantage in relation to transport systems known from the prior art.

An improved stator device for a linear motor is provided, said stator device having a simpler construction, wherein in particular, electrical contacting of a magnetic field generator for forming a magnetic field can be performed in a simple manner, and wherein in particular, it is made possible to use an optimum guide in accordance with requirements. Moreover an improved linear transport system is provided.

According to one aspect, a stator device for a linear motor is provided. The stator device comprises an electrically energizable magnetic field generator for forming a magnetic field. A holding module for holding the magnetic field generator is also provided. Here, the magnetic field generator is fastened to the holding module. Furthermore, the stator device comprises a mounting device which is formed separately from the holding module and which is designed for the fastening of a guide for guiding a vehicle. The holding module is fastened to the mounting device.

According to a further aspect, a linear transport system is provided. The linear transport system comprises the above-mentioned stator device and a support for a vehicle, wherein the support comprises a reaction part which is designed to interact with the magnetic field formed by means of the magnetic field generator of the stator device, such that in particular, a thrust force is advantageously formed that displaces or moves the support. The reaction part is preferably formed as a further magnetic field generator for forming a magnetic field. In particular, multiple supports may be formed, which supports are preferably of identical or different form.

The provision of a mounting device, which is formed separately from the holding module, for the fastening of a guide for guiding a vehicle has the advantage in particular that any desired guides may be used for a particular holding module. This thus means in particular that, in accordance with the application, the optimum guide for said application can be used. The guides may thus be exchanged, such that for example allowance can be made for different geometric boundary conditions. In particular, it is thus advantageously possible for different vehicles to be used because these generally require a guide that is coordinated exactly therewith. Furthermore, it is advantageously possible for one guide to be used for multiple stator devices. In such a situation, said multiple stator devices may be arranged one behind the other, wherein the one guide is then arranged across the multiple stator devices and is fastened to the respective mounting devices. In such an embodiment, joints in the guide between the individual stator devices are advantageously eliminated, such that the running characteristics of a vehicle that travels over the multiple stator devices is advantageously improved.

It is also advantageously made possible for the guide to be mounted independently of the holding module, such that mutually separate working steps are possible. This advantageously results, in particular, in simpler assembly. Furthermore, in the event of damage or wear to the guide, said guide can be easily exchanged without the need for the stator device itself to be completely exchanged or dismounted. Both material and also costs can thus advantageously be saved.

In a further embodiment, the mounting device may have at least one bore for receiving a fastening means that fastens the guide to the mounting device. This makes possible, in particular, a simple and preferably releasable fastening. It is possible in particular for multiple bores to be provided which may be of identical or different form. The bore may for example be provided with a thread such that a screw can advantageously be provided as a fastening means. It is preferably possible for dowel pins to be provided as fastening means. Rivets, for example, may be provided as fastening means. In an alternative embodiment, the mounting device may have an adhesive layer such that the guide can advantageously be adhesively bonded to the holding module. It may preferably be provided that the guide is fastened to the mounting device by means of welding or brazing.

In another embodiment, the mounting device may be in the form of a profile element. A profile element is simple to produce, such that a corresponding construction can be produced particularly inexpensively and in a particularly simple manner in terms of assembly outlay. Within the context of the present invention, a profile element has in particular a cross section which is identical over its entire length. Within the context of the present invention, a profile element may for example be formed from the material steel. A profile element of said type may then be referred to for example as a steel profile. In an alternative embodiment, the profile element may for example be formed from plastic, in particular a fiber-reinforced plastic. The profile element may preferably be formed from aluminum. The profile element may for example be a U-profile element, a T-profile element, a Z-profile element, an L-profile element or an I-profile element. This thus means in particular that the abovementioned profile elements have a cross section which has the shape of a "U", a "T", a "Z", an "L" or an "I". The profile element may preferably have a rectangular, in particular square, cross section. The profile element may be formed from a solid material. Alternatively, the profile element may be formed from a hollow material. The profile examples listed are in particular exemplary, and should not be regarded as restrictive.

In another embodiment, the mounting device may have a first and a second holding device to which the magnetic field generator is fastened, with the magnetic field generator being arranged between the two holding devices, and with the two holding devices being fastened to opposite sides of the mounting device. In such an embodiment, the mounting device additionally advantageously provides mechanical stabilization. This thus means in particular that the mounting device absorbs external forces that act on the holding module, for example. Such a construction is advantageously mechanically particularly stable and compact. The two holding devices may be of identical or different form. The mounting device is preferably arranged above the magnetic field generator.

In another embodiment, the magnetic field generator may be adhesively bonded to the first and/or to the second holding device. It is thus advantageously possible to realize a particularly reliable and permanently retentive fastening of the magnetic field generator to the holding device or to the holding devices.

In one embodiment, the magnetic field generator may be electrically connected to or contacted with electrical conductor tracks situated on and/or in the first and/or the second holding device, in particular the printed circuit board, by means of a solder pad or multiple solder pads. This thus means in particular that electrical contacting of the magnetic field generator is realized by means of the solder pad or by means of the solder pads.

In a further embodiment, the magnetic field generator may be electrically connected to or contacted with electrical conductor tracks situated on and/or in the first and/or the second holding device, preferably the printed circuit board, by means of a plug connector and/or a screw connection and/or a clamped connection and/or or a soldered connection. This thus means in particular that electrical contacting between the magnetic field generator and the first and/or the second holding device, for example the printed circuit board, can be realized by means of a plug connector and/or a screw connection and/or a clamped connection and/or a soldered connection. It is preferably also possible for multiple plug connectors, screw connections, clamped connections and/or soldered connections to be provided.

In a further embodiment, at least one of the two holding devices, preferably both holding devices, may be formed at least partially from an electrically and/or magnetically non-conductive material.

The provision of a material composed of an electrically and/or magnetically non-conductive material for the holding device or the holding devices advantageously has the effect that the holding device has no influence, or at least no disruptive influence, on a magnetic circuit. The holding device thus yields in particular a high level of mechanical strength with regard to retention of the magnetic field generator. Furthermore, the electrically and/or magnetically non-conductive material advantageously yields a reduction in eddy-current losses.

As an electrically and/or magnetically non-conductive material, it is generally preferable for a resin or a ceramic to be provided. In particular, it may generally be provided that the holding device comprises, or is at least partially formed from, multiple different electrically and/or magnetically non-conductive materials. The material may for example be a plastic, in particular a fiber-reinforced plastic.

In one embodiment, the first and/or the second holding device may be in the form of a printed circuit board for electrical contacting of the magnetic field generator. It is thus advantageously possible to realize simple electrical contacting, for example by virtue of the magnetic field generator being soldered to the printed circuit board, with simultaneously high mechanical strength.

It is thus preferable for a printed circuit board to be provided which can advantageously both realize electrical contacting for the magnetic field generator and also hold the magnetic field generator. The printed circuit board thus advantageously performs a dual function in that it both holds and also realizes electrical contacting for the magnetic field generator.

In particular, it is thus advantageously possible to save material if, instead of two separate components which each perform only one of the above-mentioned functions, that is to say holding and electrical contacting, use is now made of one component, the printed circuit board, having both functionalities. Assembly of the stator device is also simplified considerably. The magnetic field generator is fastened to the printed circuit board, wherein then an electrical connection can be formed between the magnetic field generator and the printed circuit board by means of electrical contacting of the magnetic field generator. By virtue of the fact that the magnetic field generator is fastened to the printed circuit board, a corresponding electrical connection can be designed to be relatively short in relation to the prior art. Here, too, it is thus advantageously possible for material and assembly time to be saved. Furthermore, such an embodiment also has a smaller structural volume than known systems.

Within the context of the present invention, a printed circuit board is in particular a support for electronic components or parts. Within the context of the present invention, a printed circuit board is designed in particular for the fastening and electrical connection or contacting of electronic components. Within the context of the present invention, a printed circuit board may in particular be in the form of a conductor board, an electrical board or a printed circuit. Within the context of the present invention, a printed circuit board comprises in particular an electrically insulating material with electrically conductive connections which can preferably arranged on, preferably adhere to, the electrically insulating material. Said electrically conductive connections can preferably also be referred to as conductor tracks. The printed circuit board preferably comprises a plastic, in particular a fiber-reinforced plastic, as electrically insulating material. Through the provision of a fiber-reinforced plastic, particularly high mechanical stability of the printed circuit board is advantageously realized in at least one preferential direction, in particular in multiple preferential directions. Here, further mechanical stability may be realized in particular by means of an encapsulation of the magnetic field generator. The printed circuit board is thus capable in particular of holding even relatively large and heavy magnetic field generators. It may preferably be provided that the conductor tracks, that is to say the electrically conductive connections, are embedded in the electrically insulating material. The electrical conductor tracks are thus advantageously protected against external influences. In particular, this also advantageously has the effect that a risk of electrical short circuit is reduced if not eliminated entirely if the electrical conductor tracks are insulated both from one another and also from further electrically conductive components by means of the electrically insulating material. The provision of a printed circuit board comprising a plastic, in particular a fiber-reinforced plastic, also has the advantage in particular that a printed circuit board of said type does not influence a magnetic circuit, that is to say a magnetic field.

In a further embodiment, the mounting device may comprise an encapsulation compound that at least partially surrounds the magnetic field generator. This thus means in particular that an encapsulation of the magnetic field generator can simultaneously be used as a mounting device. In particular, an encapsulation of said type protects the magnetic field generator against external forces and thus performs a dual function: a protective function and a mounting function. A particularly compact construction is thus advantageously made possible, because in this case one component, the encapsulation, acts as two separate components. The encapsulation or the encapsulation compound is thus utilized particularly efficiently. It may preferably be provided that the encapsulation compound is an epoxy resin. It may for example be provided that the at least one bore is provided in the encapsulation compound. The encapsulation may preferably be used for the fastening of the magnetic field generator to the holding module, in particular to the holding devices. This thus means in particular that the magnetic field generator is fastened to the holding module by encapsulation.

In another embodiment, the holding module may be fastened to a support module for supporting the holding module. A modular construction is thus advantageously made possible in that it is made possible for different support modules to be used in accordance with the application and the spatial parameters. The support module may preferably be a profile element. The statements made in conjunction with the profile element as mounting device apply analogously to a profile element as a support module. In particular, the support module may have receptacles for fastening means which enable the support module to be fastened to a support plate. A spatial fastening of the support module is thus advantageously made possible. The receptacles of the support module may be of analogous form to the receptacles of the mounting device. Corresponding statements made with regard to the fastening means apply analogously to the fastening means for the fastening of the support module to the support plate.

In yet another embodiment, the support module may comprise an installation space for an electronic component. It is preferable for multiple installation spaces to be provided. The installation spaces may preferably be of identical form, or alternatively in particular of different form. In particular, multiple electronic components may be provided which are of identical or different form. Through the provision of an installation space, efficient utilization of the support module is advantageously made possible because the stator device is not enlarged yet further owing to the provision of one or more electronic components. The components are advantageously situated in a protected manner in the installation space. Furthermore, users are protected from the electronic components. Within the context of the present invention, electronic components may for example comprise activation electronics, travel measurement system electronics, electrical boards or printed circuit boards.

In another embodiment, at least one rail or at least one groove may be formed in the installation space. By means of the rail or groove, an electrical component situated in the installation space, for example a printed circuit board, can be displaced along the rail or groove. The provision of a rail or groove offers the advantage in particular that the electrical component is protected against tilting or slipping. It is preferable for multiple rails or grooves, which are of identical or different form, to be provided in order to permit displacement of a multiplicity of electrical components.

In another embodiment, the displacement of an electrical component situated in the installation space may be realized by way of a displacement means, for which purpose a slot for holding and guiding the displacement means is formed in the installation space, in particular in a wall of the installation space. By way of the displacement means, it is for example possible for an electrical component, for example a printed circuit board, to be displaced from the installation space of one stator device into the installation space of a second stator device arranged directly adjacent to the stator device. Then, in the installation space of the second stator device, it is possible for the displaced-in electrical component to be electrically connected to other electrical components of the second stator device, for example by means of a plug connector. The plug connector advantageously has, in particular, spring contacts such that not only reliable electrical contacting but also mechanical fixing of the displaced-in electrical component can be realized.

In another embodiment; the installation space may form a type of tunnel that electrical components can be displaced into. Here, it is possible for a multiplicity of stator devices arranged adjacent to one another to form an overall tunnel that electrical components, in particular printed circuit boards, of single-part or multi-part form can be displaced into. Electrical connection means for electrical contacting between the electrical components of the stator devices and the displaced-in electrical components are then arranged in the installation spaces or tunnels of the individual stator devices.

The electrical contacting of mutually adjacently arranged stator devices by means of electrical components, in particular printed circuit boards, that can be displaced in or are displaceable offers the advantage in particular that it is not necessary for every stator device to be connected by means of a cable or the like to a voltage supply and/or superordinate controller, but rather it is sufficient for one stator device to have a corresponding connection facility. Contact is established among the further connected stator devices by means of the electrical components that can be displaced in or are displaceable. In the event of exchange of individual stator devices from a stator assembly, it is then merely necessary for the displaced-in electrical components to be displaced back to the adjacent stator devices. The stator device can then be released from the assembly. After the insertion of a new stator device, it is then merely necessary for the electrical components to be displaced into the adjacent stator devices, and the electrical contacting of the overall system is restored.

In yet another embodiment, a parameter memory may be provided for activation parameters of the magnetic field generator. It is thus possible in particular for individual activation parameters, which take into consideration material-induced inaccuracies or production variance, to be stored and read out at a later point in time by a superordinate controller.

Within the context of the present invention, activation parameters refer in particular to parameters with the aid of which the magnetic field generator can be activated. Within the context of the present invention, activation parameters may include in particular a defined current profile, in particular a local current profile, or a local relationship between current and thrust force or force constant of the motor. This thus means in particular that an activation of the magnetic field generator can be effected in an advantageous manner by means of the activation parameter. Said activation parameters may preferably be read out during operation, for example by means of electronics, in particular the power electronics, or a superordinate controller, in order for the magnetic field generator to be operated correspondingly. It is preferable for the parameter memory to be arranged on or in the holding device, in particular on or in the first or second holding device. In particular, it is also possible for multiple parameter memories to be provided, such that redundancy in the event of failure is advantageously established.

In yet another embodiment, a sensor may be provided for measuring an operating parameter of the magnetic field generator. Monitoring of operating parameters is thus advantageously made possible. An operating parameter may include for example an actual current of the magnetic field generator and/or a temperature and/or an operating voltage of the magnetic field generator. The measured values may preferably be transmitted to a superordinate controller. Said transmission may take place in particular wirelessly and/or or via wires, wherein in the case of a wired transmission of the measured values, the electronic components may be used for this purpose. In a linear transport system comprising multiple stator devices arranged one behind the other, which stator devices thus form a travel track/travel path for a vehicle, it is thus advantageously possible to realize individual monitoring of the individual stator devices. It is preferably possible for multiple sensors to be provided. The sensors may in particular be of identical form or alternatively preferably of different form. A sensor which measures a current, in particular an actual current, may also be referred to as a current sensor. A sensor that can measure a temperature may for example be referred to as a temperature sensor.

In yet another embodiment, the guide for guiding a vehicle may be provided, with the guide being arranged above the magnetic field generator and being fastened to the mounting device. Mechanical decoupling of the tolerances between the spacing of the reaction part of the support and the magnetic field generator, on the one hand, and bearing means of the support, such as rollers, and the guide, on the other hand, is thus advantageously realized. Furthermore, wear of the guide and/or of the bearing means is advantageously minimized. The corresponding tolerances are thus advantageously decoupled from one another, such that mechanical dimensions that must be adhered to for example between the running rollers or slide rails are influenced only by the guide itself. Tolerances in the holding module with the magnetic field generator or of a possible further main profile advantageously have no influence on a preload force of multiple guides with respect to one another, which guides are arranged one behind the other.

In another embodiment, the guide may for example be in the form of a rail, such that guidance of a roller-guided vehicle can be realized in an advantageous manner. The vehicle may preferably additionally or alternatively be fluid-guided, that is to say in particular air-guided or gas-guided, and/or magnet-guided.

In a further embodiment, the guide may have a cross-sectional shape with two opposite constrictions. This thus means in particular that, in a cross-sectional view, the guide has in each case one opposing constriction on two opposite sides. In this respect, the guide is in the shape of an hourglass. In this way, it is advantageously possible for a running roller to rest in said constriction and be guided in said constriction. It is preferable here for multiple running rollers to be provided which are arranged one behind the other.

In another embodiment, the reaction part may comprise a soft magnetic material. It may preferably be provided that the reaction part is formed as a structure from a soft magnetic material or comprises a structure of said type. A soft magnetic material refers in particular to a ferromagnetic material which can be easily magnetized in a magnetic field. A soft magnetic material has no inherent permanent magnetic field, or only a very weak inherent magnetic field, that is to say is not a permanent magnet. The soft magnetic material preferably has a coercive field strength of less than 1000 A/m. A soft magnetic material may for example comprise iron and/or ferrites, which are in particular ceramic or sintered materials. A soft magnetic material may for example comprise a cobalt-iron alloy and/or a nickel-iron alloy and/or ferrosilicon (FeSi) alloy and/or iron-aluminum-silicon (FeAlSi) alloy. A material may be classified as a soft magnetic material in particular in accordance with the IEC 60404-1 standard. This thus means in particular that a soft magnetic material may be selected from the group of materials formed by said standard.

The provision of such a soft magnetic material advantageously has the effect that a linear motor of said type comprising the stator device and the support with the soft magnetic material operates on the basis of the reluctance principle. Such a linear motor can thus be referred to in particular as a reluctance motor. The mode of operation is in particular as follows.

The movement or displacement of the support arises in particular as a result of the fact that the system comprising the soft magnetic material and the magnetic field generator strives to achieve minimum reluctance, also referred to as magnetic resistance. Here, the soft magnetic material is magnetized owing to the magnetic field formed by the magnetic field generator, and is magnetically attracted by the magnetic field generator such that the support is displaced. In particular if multiple magnetic field generators are provided along a travel path, the magnetic field generators are energized temporally in succession, such that, along the travel path, a magnetic field builds up which correspondingly magnetically attracts the soft magnetic material, wherein it may preferably be provided that, when maximum convergence on the movable part is achieved, that is to say when the gap between magnetic field generator and soft magnetic material has been minimized, a corresponding energy supply is deactivated. This thus means in particular that, when the gap has been minimized or the magnetic field lines assume the shortest possible path and no longer generate a thrust force, the current for the corresponding magnetic field generator is deactivated.

This thus means in particular that the first magnetic field generator is energized in order to magnetically attract the vehicle in the direction of the first magnetic field generator. When the gap has been minimized or the magnetic field lines have assumed the shortest possible path and no longer generate a thrust force, a current for the first magnetic field generator is deactivated. Then, a second magnetic field generator which is arranged so as to follow the first magnetic field generator is energized such that the second magnetic field generator magnetically attracts the support, and thus in particular a vehicle, in the direction of the second magnetic field generator. When the gap has been minimized or the magnetic field lines have assumed the shortest possible path and no longer generate a thrust force, a current for the second magnetic field generator is deactivated. Then, a third magnetic field generator which is arranged so as to follow the second magnetic field generator is energized such that the third magnetic field generator magnetically attracts the support and thus the vehicle in the direction of the third magnetic field generator. The above-stated steps are then performed analogously for the fourth and any further following magnetic field generators.

In a further embodiment, the energization may be performed in accordance with a mathematical function. A sinusoidal function, for example, may be provided. It is preferably possible for the energization to take place with temporally different and/or locally different displacements in multiple magnetic field generators simultaneously, such that here, it is not merely simple activation and deactivation that is performed.

Within the context of the present invention, a magnetic field generator is designed in particular so as to form a magnetic field when electrically energized. This applies analogously to the further magnetic field generators. For the purpose of better distinction, the magnetic field formed by the further magnetic field generator is referred to as further magnetic field. The magnetic field and the further magnetic field advantageously interact with one another such that, by means of the vector product of the Lorentz force, a thrust force is imparted to the support, such that the latter performs a movement, in particular a translatory movement.

In one embodiment, a vehicle may be fastened to the support, such that said vehicle can be displaced correspondingly. Within the context of the present invention, a vehicle may preferably also be referred to as a carriage. In English, the expression "mover" is generally used for this. It is preferably possible for the further magnetic field generator to form a static magnetic field. This thus means in particular that the further magnetic field is a static magnetic field. The further magnetic field generator preferably comprises one or more permanent magnets. In particular, the further magnetic field generator may be in the form of a permanent magnet.

In a further embodiment, the support may have multiple further magnetic field generators. It is preferable for the support to have multiple magnetic field generators which are arranged opposingly at respectively opposite ends of the magnetic field generator, such that a gap is formed between the further magnetic field generators and the magnetic field generator. The magnetic field generator and the further magnetic field generators in the linear transport system are thus arranged spaced apart from one another. It is preferable for the support to have two legs, wherein the multiple magnetic field generators are formed on inner sides of the legs. The magnetic field generator may preferably be arranged between the two legs and opposite the inner sides of the legs. The support preferably has a U shape. Owing to the two legs and the corresponding arrangement, a double gap arrangement is formed in that in each case one gap is formed between the inner sides of the legs and the corresponding sides of the magnetic field generator.

In another embodiment, multiple magnetic field generators may be provided. It is thus possible, for example, for a particularly large resultant magnetic field to be formed. Furthermore, it is thus advantageously also possible to form a spatially extended region in which a magnetic field can be formed. A travel path can thus advantageously be formed. The multiple magnetic field generators may preferably be of identical or different form. It is preferably possible for the multiple magnetic field generators to be individually energized such that, in particular, it is advantageously possible for different magnetic fields to be formed in each case. The multiple magnetic field generators are preferably connected so as to form a multi-phase system. It is possible in particular for three phases to be provided. This thus means in particular that each magnetic field generator of the multiple magnetic field generators is assigned one phase of an electrical current.

In one embodiment, the magnetic field generator may comprise a coil. The magnetic field generator may preferably comprise multiple coils. The coils may preferably be of identical or different form. In a further possible exemplary embodiment, the coil is in the form of an air-core coil. An air-core coil has no core, that is to say is of coreless form. The core is, as it were, composed of air. In an alternative advantageous embodiment, the coil may comprise a core. This thus means in particular that the coil is wound around a core. The core may for example be an iron core. The core may for example be formed from a hollow material or a solid material. The core may preferably comprise a soft magnetic material. In particular, the core has a material with high permeability and/or with low remanence. The core preferably comprises a sintered material. The core may in particular be formed from a sintered solid material. The provision of a sintered material in a core of a coil has the advantage in particular that the eddy currents that can be induced in a core of said type are low to non-existent, whereby eddy-current losses can be advantageously reduced if not eliminated entirely. Furthermore, by means of suitable pressing tools, specific geometries of a core composed of a sintered material can be produced in a simple and inexpensive manner.

Within the context of the present invention, a linear motor corresponds in particular to a linear embodiment of a rotary machine, having an energizable primary part, similar to a stator of a rotary motor, and having a secondary part, corresponding to a rotor of the rotary motor. In the light of these statements, the magnetic field generator may be referred to as the primary part. The reaction part, in particular the further magnetic field generator, may be referred to as the secondary part. In the case of linear motors, it is possible in particular to make a distinction between asynchronous and synchronous motors, wherein in the case of the asynchronous type of construction, the secondary part is fitted with short-circuit rods, whereas in the case of the synchronous motor, said secondary part is composed of permanent magnets. Synchronous motors have the advantage in particular that they exhibit high efficiency and high continuous thrust forces. Within the context of the invention, linear motors may be used in particular for generating translatory thrust movements. In the light of the statements made above, the stator device and the reaction part form a linear motor.

In the light of the statements above, a core of a coil may also be referred to as a stator tooth. The cores or stator teeth about which the coils can be wound may for example be of identical or different form. A stator tooth about which a coil is wound may preferably be referred to as a wound stator tooth. A stator tooth about which no coil is wound may preferably be referred to as a non-wound stator tooth.

In another embodiment, the first holding device may have a first cutout in which a first holding section of the magnetic field generator is inserted and fixed. This thus means in particular that the first holding section of the magnetic field generator is fixed so as to be inserted in the first cutout. This thus means in particular that the first holding section is inserted into the first cutout and subsequently or simultaneously fixed. It is preferably possible for a form-fitting and/or force-fitting or frictionally locking fixing to be provided. The fixing may preferably be realized by means of adhesive bonding and/or welding and/or encapsulation.

In one embodiment, the magnetic field generator may comprise a stator tooth and a coil wound around the stator tooth, with the first holding section being formed on a first end of the stator tooth. This thus means in particular that the stator tooth is, at a first end, inserted into and fixed in the first cutout of the first holding device. This embodiment has the advantage in particular that, in this way, particularly simple mounting of a coil with a core on the holding device, preferably on the printed circuit board, is made possible. It is preferably possible for the non-wound core or the non-wound stator tooth, at the first end thereof, to be inserted into and fixed in the first cutout. Subsequently, it may for example be provided that the coil is wound around the still non-wound core or stator tooth. The formation of a coil by winding a coil wire around a core is thus advantageously simplified considerably. In particular, it is thus advantageously possible to realize a copper fill factor of the coil of greater than 60%. It may preferably be provided that a pre-wound coil is pushed onto the stator tooth, or the stator tooth is pushed into a pre-wound coil. It is preferable for a coil wire to be wound directly around the stator tooth; in particular, for this purpose, use is made of a self-bonding wire, wherein the direct winding advantageously yields high mechanical strength between the coil and stator tooth. Furthermore, an achievable fill factor, in particular a copper fill factor, is improved yet further. The stator tooth that is fully wound in this way is then preferably inserted into the cutout.

In a further embodiment, the second holding device may have a second cutout in which a second holding section of the magnetic field generator is inserted and fixed. The statements made in conjunction with the first holding section of the magnetic field generator apply analogously to the second holding section.

In a further embodiment, the second holding section may be formed on a second end, which is situated opposite the first end, of the stator tooth. This thus means in particular that the stator tooth or the core of the coil is inserted into and fixed in respect of cutouts of the two holding devices. The corresponding statements regarding the first end of the stator tooth apply analogously to the second end of the stator tooth. It is preferable for the stator tooth, the coil and the holding devices to be fixed together to form the structural unit by means of encapsulation, which additionally leads to increased strength of the structural unit.

In another embodiment, it may be provided that multiple magnetic field generators which are spaced apart from one another are formed, wherein, between two magnetic field generators, there is provided in each case one non-wound stator tooth which, at a respective one of two opposite ends of the stator tooth, is inserted into and fixed in a respective cutout of the two holding devices. Through the provision of a non-wound stator tooth between two magnetic field generators, in particular between two wound stator teeth, it is advantageously possible in particular to realize a reduction of harmonics in electromagnetic force vectors.

In a further embodiment, multiple magnetic field generators which are spaced apart from one another may be formed, with in each case only a gap, in particular a minimal gap, being formed between two magnetic field generators. As a result of the direct lining-up of the magnetic field generators, the drive force generated by means of the magnetic field generators can advantageously be increased.

In a further embodiment, the first holding device, for example the printed circuit board, has multiple first cutouts. Cutouts of the first holding device may generally also be referred to in particular as first cutouts. It may preferably be provided that a first holding section, in particular a stator tooth, about which in each case one coil is wound, is inserted into every second first cutout. It may preferably be provided that, between two such wound stator teeth, a non-wound stator tooth is inserted into and fixed in the correspondingly free first cutout. Through the provision of multiple cutouts, it is in particular advantageously possible for a travel path for the vehicle to be formed, along which said vehicle can be displaced. The first cutouts may be arranged so as to run linearly. This thus means in particular that a linear travel path is advantageously thereby formed. The first cutouts may preferably be arranged so as to run with a curvature. This thus means in particular that the first cutouts are arranged along a curve with a curvature. It is preferably possible for the first cutouts to be arranged along a section of a circular arc. In particular, the first cutouts may be arranged along a clothoid. A clothoid is in particular a curve in which a radius at the beginning is greater than a mean radius and a radius at a later point is smaller than a mean radius. This thus means in particular that a curvature profile of the clothoid increases linearly. Jerk-free travelling dynamics of the vehicle are thus advantageously realized.

In a further embodiment, the second holding device may have multiple second cutouts. Cutouts of the second holding device may generally also be referred to as second cutouts. It may preferably be provided that a second holding section of a magnetic field generator is inserted into and fixed in every second one of the second cutouts. It is preferably possible for a non-wound stator core to be inserted into and fixed in the interposed second cutout. The corresponding statements made with regard to the first holding device with the first cutouts apply analogously to the second holding device with the second cutouts.

In another embodiment, the first and/or the second holding device, which are/is for example advantageously in the form of (a) printed circuit board(s), may have power electronics for the activation of the magnetic field generator. In this way, it is advantageously possible for a corresponding installation space to be utilized particularly efficiently in that, in this case, the power electronics can be fastened directly to the holding device. It may preferably be provided that the power electronics are embedded in the holding device so as to be advantageously protected against external influences. The provision of power electronics on or in the holding device has the advantage in particular that corresponding signal paths between the power electronics and the conductor tracks or the magnetic field generator can be designed to be short, such that corresponding signal losses are reduced. Furthermore, an installation space is advantageously reduced in size.

The invention claimed is:

1. A linear transport system comprising
    an assembly of a plurality of adjacently arranged transport system modules, and
    a vehicle,
    each transport system module comprising a stator, the stator being connected to an adjacently arranged stator by means of an electrical component which can be displaced in or is displaceable,
    each stator comprising a plurality of magnetic field generators,
        each magnetic field generator having at least one coil,
        each magnetic field generator being individually energized,
    the magnetic field generators forming a travel path for the vehicle, along hich said vehicle can be displaced,
    wherein a first linear transport system module has straight form and a second linear transport system module has arcuate form,
    the vehicle comprising a support, the support comprising a reaction part which is designed to interact with the magnetic field formed by means of the magnetic field generators, such that a thrust force is formed that moves the support,
    wherein the magnetic field generators of the stator of the second linear transport system module are arranged along a curve of a clothoid form, a curvature profile of the clothoid form increasing linearly.

2. The linear transport system of claim 1, wherein each stator comprises a first circuit board and a second circuit board, wherein the coils of the magnetic field generators are arranged between the two circuit boards.

3. The linear transport system of claim 2, wherein the first and second circuit boards have first and second cutouts respectively, the first and second cutouts being arranged opposite one another and bearing stator teeth.

4. The linear transport system of claim 3, wherein a coil of a magnetic field generator is wound around every second stator tooth.

5. A stator for a linear motor, comprising:
    a plurality of electrically energizable magnetic field generators for forming a magnetic field, and
    a first holding device comprising a plurality of first cutouts for holding the plurality of magnetic field generators,
    the plurality of first cutouts forming a travel path for a vehicle, along which said vehicle can be displaced,
    the plurality of first cutouts being arranged along a clothoid, a curvature profile of the clothoid increasing linearly.

6. The stator device of claim 5 comprising a second holding device comprising a plurality of second cutouts for holding the plurality of magnetic field generators, wherein the plurality of magnetic field generators is arranged between the first and second holding devices.

7. The stator device of claim 6, each magnetic field generator comprising a stator tooth and a coil wound around the stator tooth, wherein the plurality of magnetic field generators is arranged between the two holding devices in that a first end of the stator tooth is inserted into and fixed in a first cutout of the first holding device and wherein the second end of the stator tooth is inserted into and fixed in a second cutout of the second holding device.

8. The stator device as claimed in claim 7, wherein a non-wound stator tooth is arranged between the two adjacent magnetic field generators.

9. The stator device as claimed in claim 5, further comprising a mounting device which is formed separately from the first holding device and which is designed for fastening of a guide for guiding said vehicle, wherein the first holding device is fastened to the mounting device in that two holding devices are fastened to opposite sides of the mounting device.

10. The stator device as claimed in claim 5, further comprising a support module for supporting the first holding device, the support module comprising an installation space for an electronic component.

11. A linear transport system comprising:
    a plurality of electrically energizable magnetic field generators for forming a magnetic field, and
    a first holding module comprising a plurality of first cutouts for holding the plurality of magnetic field generators,
    the plurality of first cutouts forming a travel path for a vehicle, along which said vehicle can be displaced,
    the plurality of first cutouts being arranged along a clothoid, a curvature profile of the clothoid increasing linearly, and
    a support for the vehicle, the support comprising at least one reaction part which is designed to interact with the magnetic field formed by means of the magnetic field generator of the stator device.

12. The linear transport system as claimed in claim 11, wherein the reaction part comprises at least one permanent magnet.

13. The linear transport system as claimed in claim 12, wherein the reaction part comprises a soft magnetic material.

* * * * *

UNITED STATES PATENT AND TRADEMARK OFFICE
CERTIFICATE OF CORRECTION

PATENT NO. : 10,181,780 B2
APPLICATION NO. : 14/600139
DATED : January 15, 2019
INVENTOR(S) : Jan Achterberg and Uwe Prussmeier Page 1 of 1

It is certified that error appears in the above-identified patent and that said Letters Patent is hereby corrected as shown below:

In the Claims

Column 23, Line 59, Claim 1, Line 15:
"vehicle, along hich said vehicle can be displaced,"
Should read:
--vehicle, along which said vehicle can be displaced,--

Signed and Sealed this
Sixteenth Day of July, 2019

Andrei Iancu
*Director of the United States Patent and Trademark Office*